US012798488B2

(12) United States Patent
Westfall et al.

(10) Patent No.: US 12,798,488 B2
(45) Date of Patent: Nov. 17, 2026

(54) VEHICLE STORAGE SYSTEM

(71) Applicant: Ford Global Technologies, LLC, Dearborn, MI (US)

(72) Inventors: Christopher Robert Westfall, Mountain View, CA (US); John Granger Opfer, Rochester, MI (US); Adam C. Carlson, Ann Arbor, MI (US); Matthew Williams, Dearborn, MI (US); Samuel Martin Hoff, Hazel Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 167 days.

(21) Appl. No.: 18/948,892

(22) Filed: Nov. 15, 2024

(65) Prior Publication Data

US 2025/0065810 A1 Feb. 27, 2025

Related U.S. Application Data

(63) Continuation of application No. 18/220,438, filed on Jul. 11, 2023, now Pat. No. 12,179,707, which is a continuation of application No. 17/246,105, filed on Apr. 30, 2021, now Pat. No. 11,738,691.

(51) Int. Cl.
*B60R 7/04* (2006.01)
*B60R 5/04* (2006.01)

(52) U.S. Cl.
CPC ................ *B60R 7/043* (2013.01); *B60R 5/04* (2013.01)

(58) Field of Classification Search
CPC .. B60R 7/043; B60R 7/02; B60R 7/04; B60R 5/044; B60R 5/041; B60R 5/00; B60R 5/04; B60P 1/64; B60P 3/423; B62D 33/042
USPC ............ 296/24.44, 37.15, 37.16, 37.1, 24.4; 224/542
See application file for complete search history.

(56) References Cited

U.S. PATENT DOCUMENTS

| | | | |
|---|---|---|---|
| 912,166 A | 2/1909 | Pomeroy | |
| 952,699 A | 3/1910 | Brien | |
| 2,172,956 A | 9/1939 | Derman | |
| 4,540,213 A | 9/1985 | Herlitz et al. | |
| 4,969,678 A * | 11/1990 | Loisel | B60P 3/38 296/37.16 |
| 5,088,636 A | 2/1992 | Barajas | |
| 5,484,091 A | 1/1996 | Malinowski et al. | |
| 5,722,711 A | 3/1998 | German | |

(Continued)

FOREIGN PATENT DOCUMENTS

| | | |
|---|---|---|
| FR | 2906774 A1 | 4/2008 |
| GB | 2569195 B | 11/2019 |

(Continued)

*Primary Examiner* — Wenwei Zhuo
(74) *Attorney, Agent, or Firm* — Vichit Chea; Price Heneveld LLP

(57) ABSTRACT

A vehicle storage system includes a base that is configured to be disposed on seating assemblies within a rear seating space. A first partition is coupled to the base, and the first partition extends along a first edge of the base. A second partition is spaced from the first partition. The second partition is coupled to the base and extends along a second opposing edge of the base. A cross member is coupled to a top edge of each of the first partition and the second partition. The cross member extends adjacent to a headliner.

15 Claims, 12 Drawing Sheets

(56) References Cited

U.S. PATENT DOCUMENTS

| | | | | |
|---|---|---|---|---|
| 6,623,059 | B2 * | 9/2003 | Gehring | B60R 7/02 296/37.16 |
| 9,132,786 | B2 | 9/2015 | Roach et al. | |
| 9,718,415 | B2 | 8/2017 | Squicciarini | |
| 10,070,722 | B2 | 9/2018 | Peregrina et al. | |
| 10,351,066 | B2 | 7/2019 | Munro et al. | |
| 10,624,484 | B1 | 4/2020 | Mountford et al. | |
| 11,897,429 | B2 * | 2/2024 | Meador | B60R 7/043 |
| 2001/0020631 | A1 * | 9/2001 | Spykerman | B60R 7/02 224/539 |
| 2002/0014505 | A1 | 2/2002 | Lance et al. | |
| 2003/0227188 | A1 | 12/2003 | De Gaillard | |
| 2007/0158347 | A1 * | 7/2007 | Ohayon | B65D 1/22 220/23.6 |
| 2012/0048903 | A1 | 3/2012 | Fowler et al. | |
| 2017/0341586 | A1 * | 11/2017 | Wang | B60R 7/02 |
| 2019/0225158 | A1 | 7/2019 | Loewe et al. | |
| 2019/0352087 | A1 * | 11/2019 | Williams | B60R 7/043 |
| 2020/0017032 | A1 | 1/2020 | Catlin | |
| 2020/0108777 | A1 | 4/2020 | Mozurkewich et al. | |
| 2023/0024026 | A1 | 1/2023 | Gill et al. | |
| 2023/0097471 | A1 * | 3/2023 | DeStasio | B60R 7/043 224/542 |
| 2023/0101348 | A1 * | 3/2023 | Meador | B60R 7/08 224/542 |
| 2023/0391271 | A1 | 12/2023 | Harmon et al. | |
| 2024/0002174 | A1 | 1/2024 | Martin | |
| 2024/0017675 | A1 * | 1/2024 | Oliveira | B60R 5/04 |

FOREIGN PATENT DOCUMENTS

| | | | |
|---|---|---|---|
| KR | 200363216 | Y1 | 10/2004 |
| KR | 1020140112859 | A | 9/2014 |

* cited by examiner

VEHICLE STORAGE SYSTEM

CROSS-REFERENCE TO RELATED APPLICATIONS

This application is a continuation of U.S. patent application Ser. No. 18/220,438, filed Jul. 11, 2023, now U.S. Pat. No. 12,179,707, entitled VEHICLE STORAGE SYSTEM, which is a continuation of and claims priority to U.S. patent application Ser. No. 17/246,105, filed Apr. 30, 2021, now U.S. Pat. No. 11,738,691, entitled VEHICLE STORAGE SYSTEM, the disclosure of each is hereby incorporated herein by reference in its entirety.

FIELD OF THE DISCLOSURE

The present disclosure generally relates to a storage system. More specifically, the present disclosure relates to a storage system for a vehicle.

BACKGROUND OF THE DISCLOSURE

Vehicles may have various areas within an interior for storing items. The various areas may include a trunk or other areas within the vehicle.

SUMMARY OF THE DISCLOSURE

According to at least one aspect of the present disclosure, a vehicle storage system includes a base that is configured to be disposed on seating assemblies within a rear seating space. A first partition is coupled to the base. The first partition extends along a first edge of the base. A second partition is spaced from the first partition. The second partition is coupled to the base and extends along a second opposing edge of the base. A cross member is coupled to a top edge of each of the first partition and the second partition. The cross member extends adjacent to a headliner.

According to another aspect of the present disclosure, a vehicle storage system includes a base that has a first portion that is configured to extend along a surface of seating assemblies and a second portion that is configured to extend along a floor of a cargo space. A first partition extends along an edge of the base. A second partition extends parallel to the first partition and along the base between the seating assemblies and the cargo space. A cross member is coupled to a top edge of each of the first partition and the second partition. A first sidewall is coupled to the second portion of the base. The first sidewall extends along a first side edge of the base. A second sidewall is coupled to the second portion of the base. The second sidewall extends along a second side edge of the base that opposes the first side edge.

According to another aspect of the present disclosure, a storage system for a vehicle includes a first storage assembly that is configured to be disposed in a seating space of said vehicle. The first storage assembly includes a first base that has a first edge and a second opposing edge, a first partition that extends along the first edge of the first base, and a second partition that extends along the second opposing edge of the first base. A second storage assembly is configured to be disposed in a cargo space of said vehicle. The second storage assembly includes a second base that has a first side edge and a second side edge opposing the first side edge, a support wall that extends between the first side edge and the second side edge, a dividing wall that extends from a support wall, and a cross feature that is coupled to the dividing wall and extends parallel to the support wall.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the presently disclosed device will be set forth in the detailed description which follows and will be apparent to those skilled in the art from the description, or recognized by practicing the device as described in the following description, together with the claims and appended drawings.

Figure 1:
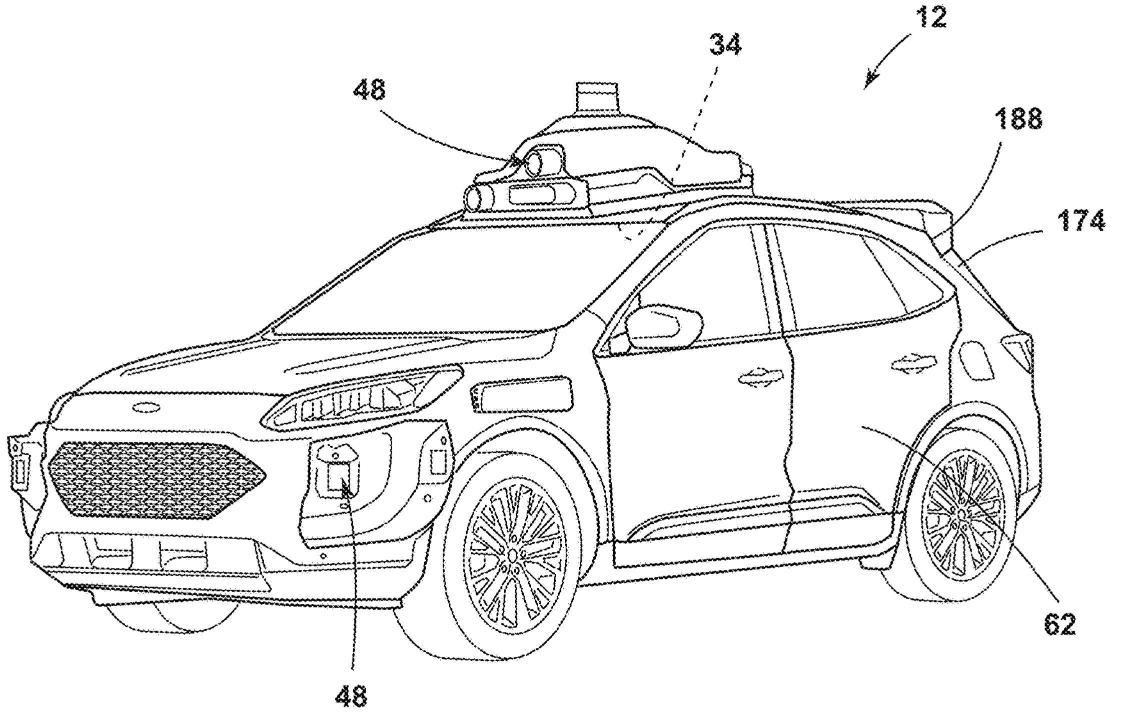
FIG. 1 is a front perspective view of a vehicle, according to the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-20, reference numeral 10 generally designates a storage system for vehicle 12 that includes a base 14 configured to be disposed on seating assemblies 16 in a rear seating space 18. A first partition 20 is coupled to the base 14 and extends along a first edge 22 of the base 14. A second partition 24 is spaced from the first partition 20. The second partition 24 is coupled to the base 14 and extends along a second opposing edge 26 of the base 14. A cross member 28 is coupled to a top edge 30, 32 of each of the first partition 20 and the second partition 24. The cross member 28 extends adjacent to a headliner 34.

Referring to FIG. 1, the vehicle 12 includes an interior compartment 40 with multiple seating assemblies 16, 42 for supporting passengers thereon. The seating assemblies 42 are arranged in a front seating space 44, and the seating assemblies 16 are arranged in the rear seating space 18. The interior compartment 40 also includes a cargo space 46 disposed behind the rear seating space 18 (e.g., in a vehicle-rearward direction). Additional or fewer seating assemblies and seating spaces or rows may be disposed within the interior compartment 40 without departing from the teachings herein.

The vehicle 12 may be a sedan, a sport utility vehicle, a van, a truck, a crossover, other wheeled motor vehicles 12, or other styles of vehicles 12. In the illustrated example, the vehicle 12 is an autonomous vehicle 12. Autonomous vehicles 12 use a variety of sensors 48 and computing devices to operate the vehicle 12 with various levels of interaction from a human driver. The computing devices of the vehicle 12 may operate the vehicle 12 in an autonomous mode, a semiautonomous mode, or a non-autonomous mode.

An autonomous mode is one in which each of a propulsion, a braking, and a steering system of the vehicle 12 is controlled by the computing devices. In the semiautonomous mode, the computing devices control one or two of the propulsion, the braking, and the steering systems of the vehicle 12, with a human operator controlling the other system or systems. In the non-autonomous mode, the human operator controls the propulsion, the braking, and the steering systems of the vehicle 12. It is contemplated that the vehicle 12 may be a fully autonomous vehicle 12 (e.g., operated without the human operator), a partially autonomous vehicle 12 (e.g., operated with or without the human operator), or a manually operated vehicle 12 (e.g., operated with the human operator) without departing from the teachings herein.

The vehicle 12 may be used for personal and/or commercial purposes, such as, for ride providing services (e.g., chauffeuring), transporting, deliveries, ridesharing services, etc. In certain aspects, the vehicle 12 may be used for transporting both people and goods. The vehicle 12 may use the storage system 10 when transporting goods and may remove at least a portion of the storage system 10 when transporting people. The configuration of the seating assemblies 16, 42 and the cargo space 46 allows for quick installation and removal of the storage system 10 to quickly transition between transporting people and transporting goods.

Figure 2:
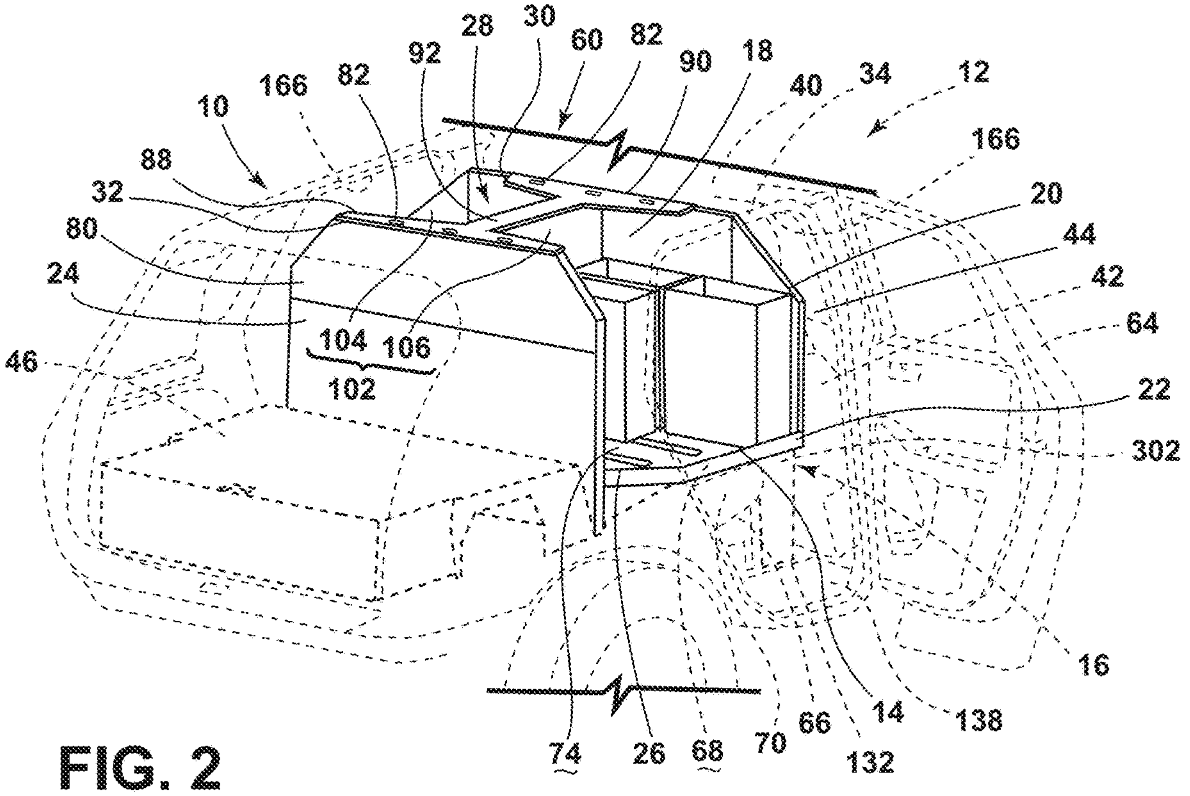
FIG. 2 is a rear perspective view of a storage assembly disposed in a rear seating space, according to the present disclosure.
Figure 3:
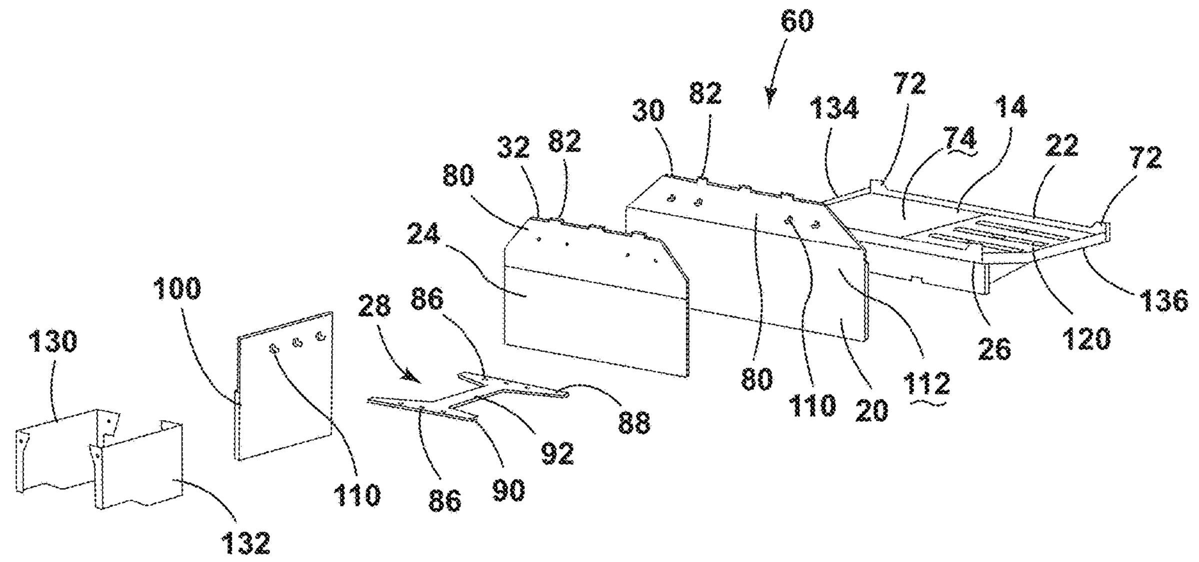
FIG. 3 is a rear perspective exploded view of the storage assembly of FIG. 2.

Referring to FIGS. 2 and 3, the storage system 10 includes a first storage assembly 60 disposed within the rear seating space 18. The first storage assembly 60 generally extends from a first side door 62 to a second side door 64 within the rear seating space 18. Additionally, the first storage assembly 60 generally extends from the seating assemblies 42 in the front seating space 44 to the cargo space 46. Additionally or alternatively, the first storage assembly 60 generally extends from the seating assemblies 16 to the headliner 34 of the vehicle 12. In this way, the first storage assembly 60 substantially fills the rear seating space 18. The cargo space 46 in the example illustrated in FIG. 2 may be utilized for housing other aspects or components of the vehicle 12 and may not be used for housing the first storage assembly 60. In certain aspects, the first storage assembly 60 may have a cross-car length in a range between about 1300 mm to about 1400 mm, a fore-aft width in a range between about 600 mm to about 700 mm, and a height in a range between about 800 mm to about 900 mm. Other configurations of the first storage assembly 60 are contemplated without departing from the teachings herein.

The seating assemblies 16 are illustrated in a lowered position 66. In the lowered position 66, a rear surface 68 of seatbacks 70 of the seating assemblies 16 are used to support the first storage assembly 60. The base 14 of the first storage assembly 60 is supported on the rear surfaces 68 of the seatbacks 70 of the seating assemblies 16. The base 14 may be coupled to various locations of the seating assemblies 16 or the vehicle 12 to couple the first storage assembly 60 to the vehicle 12. Other components of the first storage assembly 60 may be coupled to the vehicle 12 via the base 14 and may not otherwise be directly coupled to the vehicle 12. The base 14 may first be coupled to the vehicle 12 and then the additional components may be coupled to the base 14. Alternatively, the first storage assembly 60 may be assembled and then inserted into the vehicle 12 and coupled thereto.

Referring still to FIGS. 2 and 3, the first storage assembly 60 includes the base 14 configured to be disposed on the seatbacks 70 of the seating assemblies 16. The base 14 has the first edge 22, which is generally a vehicle-forward edge and the second edge 26, which is generally a vehicle-rearward edge. The base 14 generally has a first height at the first edge 22 and a second height at the second edge 26. Generally, the first height is less than the second height, such that the base 14 increases in height in a front to a rear direction when installed in the vehicle 12. Generally, when the seatbacks 70 are in the lowered position 66, the seatbacks 70 are disposed at an angle with a forward portion at a higher position than a rear portion. The base 14 with the increasing height from the first edge 22 to the second edge 26 then provides for a substantially level top surface 74 when the base 14 is positioned on the seatbacks 70.

Flanges 72 extend vertically above the top surface 74 of the base 14 at the first and second edges 22, 26. The flanges 72 are generally arranged at corners of the base 14 (e.g., four flanges 72 are included). It is also contemplated that the base 14 includes two flanges 72, with each flange 72 extending a substantial portion, or the entirety, of a cross-car length of the base 14 along the first and second edges 22, 26, respectively. The flanges 72 may be utilized as attachment points for coupling other components of the first storage assembly 60 to the base 14.

Referring still to FIGS. 2 and 3, the first storage assembly 60 includes the first partition 20 and the second partition 24. The first partition 20 extends along the first edge 22 adjacent to the seating assemblies 42, and the second partition 24 extends along the second edge 26 adjacent to the cargo space 46. Generally, the first partition 20 and the second partition 24 are arranged in a parallel configuration on opposing sides (e.g., front and rear sides) of the base 14.

The first and second partitions 20, 24 generally extend from proximate to the seatback 70 to proximate the headliner 34. The first and second partitions 20, 24 each have an upper portion 80, which are each substantially transparent. The transparent upper portions 80 allow a driver or one of the sensors 48 to have a generally unobstructed view from the rear seating space 18 in the vehicle-rearward direction through the first storage assembly 60. In the illustrated example, the first and second partitions 20, 24 have chamfered or rounded edges on the upper portions 80 to align with a shape of the vehicle 12. Additionally or alternatively, in the illustrated example of FIG. 2, the first partition 20 and the second partition 24 generally have similar shapes; however, the first partition 20 may be larger than the second partition 24 depending on the configuration of the vehicle 12.

Each of the first and second partitions 20, 24 include tabs 82 extending from the top edges 30, 32 thereof, respectively. In the illustrated example, three tabs 82 extend from the top edge 30 of the first partition 20 and three tabs 82 extend from the top edge 32 of the second partition 24. The tabs 82 on the first partition 20 may be aligned with the tabs 82 on the second partition 24 in the fore-aft direction, or alternatively may be offset from one another.

Referring still to FIGS. 2 and 3, the cross member 28 extends between the first partition 20 and the second partition 24. While the first and second partitions 20, 24 each extend in a cross-car direction, the cross member 28 extends in a fore-aft direction of the vehicle 12. The cross member 28 includes apertures 86, which align with and receive the tabs 82 of the first and second partitions 20, 24 to couple the cross member 28 to the first and second partitions 20, 24. The cross member 28 may be advantageous for providing stability to the first storage assembly 60.

In the illustrated example, the cross member 28 has two end extensions 88, 90 coupled via a connector 92. The end extensions 88, 90 may be substantially similar. The cross member 28 is generally an “I” or “H” shape. The apertures 86 are defined on the end extensions 88, 90. The cross member 28 is generally centrally located in the first storage assembly 60.

The cross member 28 generally extends adjacent to or along the headliner 34. The cross member 28 is sized, shaped, and positioned to accommodate various cameras or image sensors that may be disposed around the interior compartment 40 of the vehicle 12. For example, when the vehicle 12 is used for deliveries of goods or other items, various image sensors may be utilized for identifying and monitoring the items in the first storage assembly 60. The cross member 28 is positioned along the headliner 34 to not substantially impede any of the fields of view of the image sensors.

Referring still to FIGS. 2 and 3, the first storage assembly 60 may include a divider 100 to divide an overall storage space 102 provided by the first storage assembly 60 into two separate storage spaces 104, 106. Generally, the divider 100 is centrally located, creating two substantially equal storage spaces 104, 106. However, it is contemplated that the divider 100 may be disposed in other locations to provide flexibility in the size of the storage spaces 104, 106. The divider 100 may be selectively added to and removed from the first storage assembly 60, allowing the user to utilize the single storage space 102 or the dual storage spaces 104, 106 interchangeably.

At least one of the first partition 20 and the divider 100 may include hooks 110 for hanging or holding handles of various items, such as bags. The hooks 110 on the first partition 20 may be arranged on an inner surface 112 thereof, which faces the second partition 24. The hooks 110 on the divider 100 may be on either side or both sides thereof, such that the hooks 110 may be used with the first space 104, the second space 106, or combination thereof.

In the example illustrated in FIG. 3, a portion of the base 14 includes slide stops 120 extending above the top surface 74. The slide stops 120 are generally elongated ribs arranged in a parallel configuration in the cross-car direction. The slide stops 120 may assist in retaining items within the selected position and prevent sliding on the items along the top surface 74 of the base 14. The slide stops 120 may be arranged within the first space 104, within the second space 106, or across the entire storage space 102. It is contemplated that the slide stops 120 may be selectively added to or removed from the first storage assembly 60 as described further herein.

Referring still to FIGS. 2 and 3, the first storage assembly 60 may include end covers 130, 132 coupled to side ends 134, 136 of the base 14, respectively. The end covers 130, 132 extend from the first edge 22 to the second edge 26 of the base 14. Generally, the first and second partitions 20, 24 extend vertically upward from the base 14, while the end covers 130, 132 extend vertically downward from the base 14. The end covers 130, 132 may be advantageous for blocking an area from the base 14 to a floor 138 of the vehicle 12 adjacent side doors 62, 64 to prevent items from falling into this area. The end covers 130, 132 may abut the side doors 62, 64, respectively, when the side doors 62, 64 are closed to assist in retaining items on the base 14 during various vehicle maneuvers.

Figure 4:
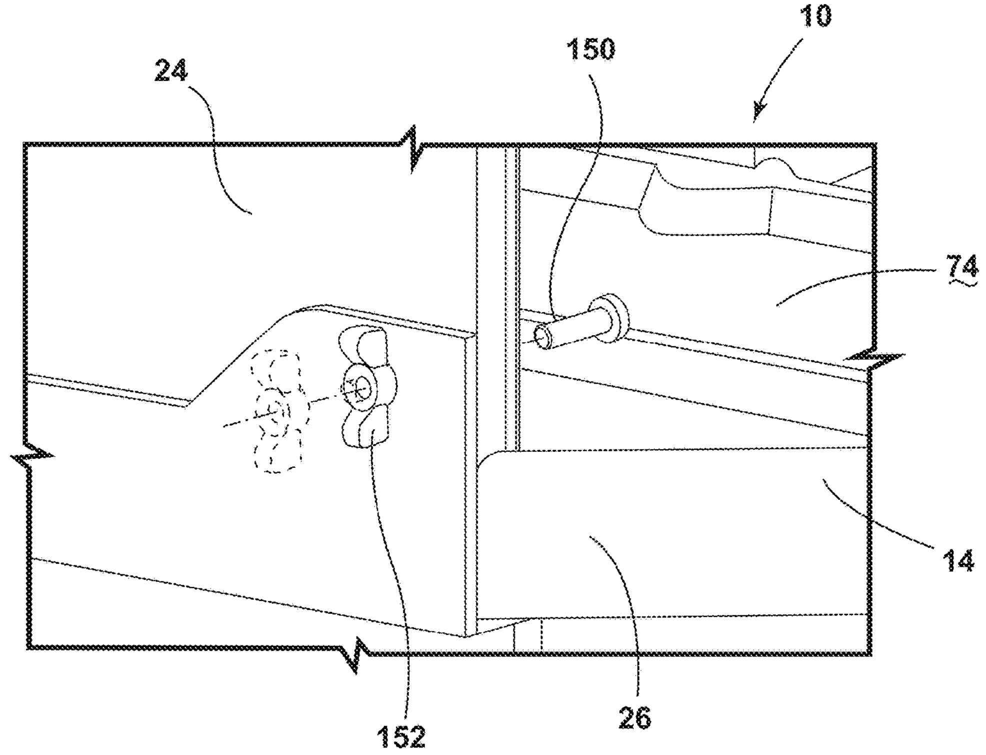
FIG. 4 is a rear perspective view of an engagement between a partition and a base of a storage assembly with a fastener and a wingnut, according to the present disclosure.

Referring to FIG. 4, the second partition 24 is illustrated as being coupled to one of the flanges 72 of the base 14. A fastener 150, such as a bolt or screw, may extend through the second partition 24 and through the flange 72 to engage a wingnut 152. The use of the wingnut 152 may be advantageous for coupling the second partition 24 and the base 14 without the use of additional tools. A user installing the first storage assembly 60 may manually tighten the wingnut 152 relative to the fastener 150 to couple the second partition 24 to the base 14. It is contemplated that the first partition 20 may be coupled to the base 14 in a similar manner.

Figure 5:
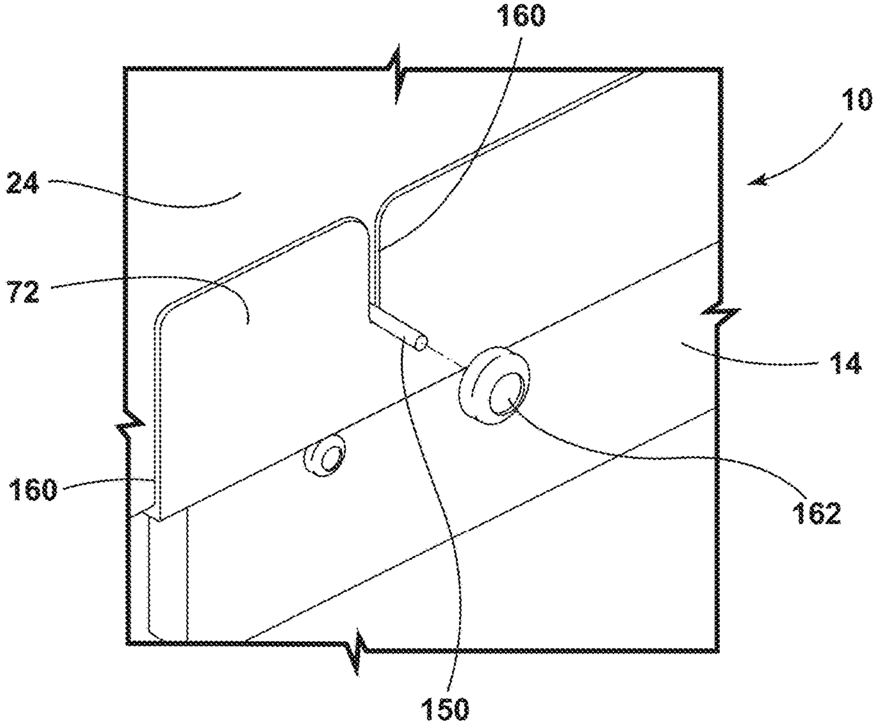
FIG. 5 is a front perspective view of an engagement between a partition and a base with the partition disposed in a track defined by the base, according to the present disclosure.

Referring to FIG. 5, in additional or alternative configurations, the base 14 may define a groove 160 along each of the first and second edges 22, 26. In FIG. 5, the first partition 20 is illustrated within the groove 160. The groove 160 may assist in positioning the first partition 20 and may also provide additional stability to the engagement between the first partition 20 and the base 14. The groove 160 may be an elongated slot defined by the base 14, or alternatively may be defined in an elevated portion that extends above the top surface 74 of the base 14. The fastener 150 and a nut 162 may be utilized to couple the first partition 20 to the base 14. When the groove 160 extends above the top surface 74, the groove 160 may define a notch 164 that received the fastener 150 for securing the first partition 20. It is contemplated that the second partition 24 may be coupled to the base 14 in a similar manner.

Referring to FIGS. 2-5, the first storage assembly 60 may be inserted into the interior compartment 40 via a door opening 166 for either of the side doors 62, 64. The first storage assembly 60 may provide a single storage area of the vehicle 12, which is positioned within the rear seating space 18. The single storage area may be utilized as the unified storage space 102 or dividing into separate spaces, such as the storage spaces 104, 106.

Figure 6:
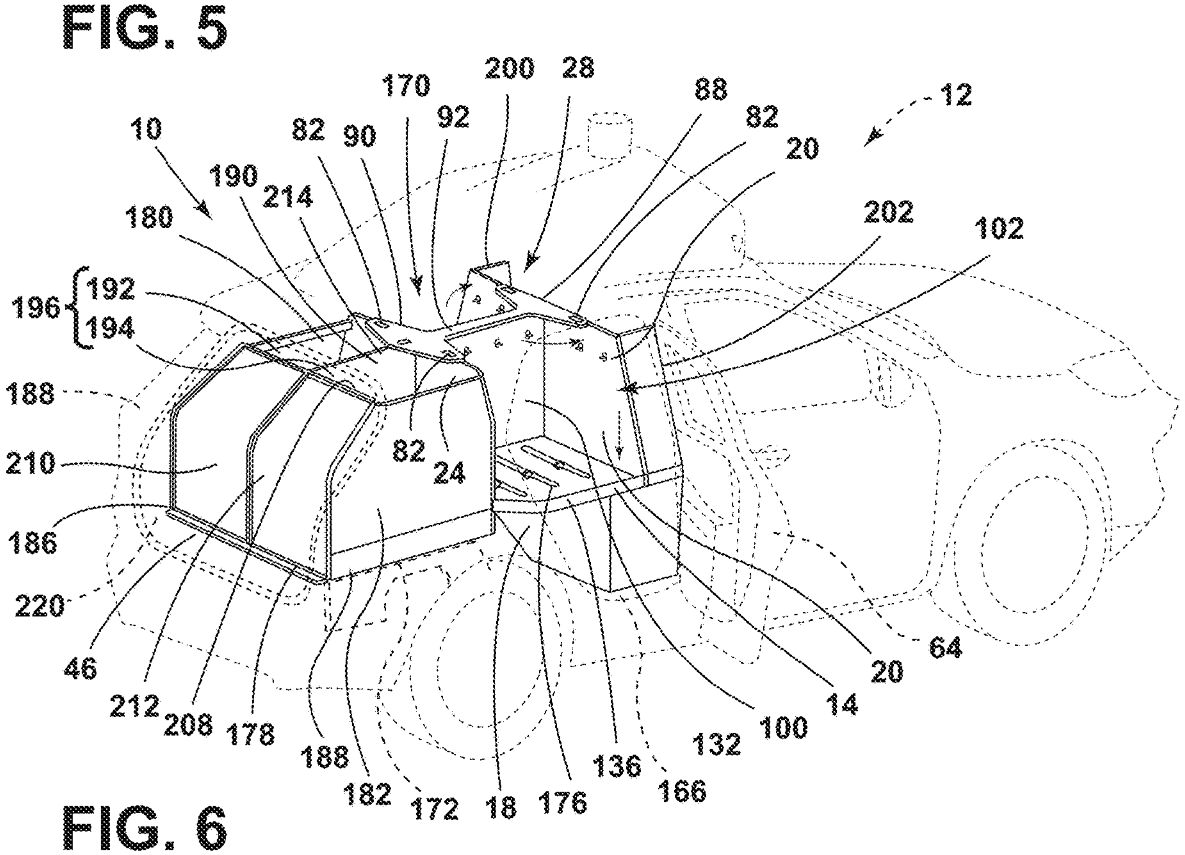
FIG. 6 is a side perspective view of a storage assembly in a rear seating space and a cargo space of a vehicle, according to the present disclosure.

Referring to FIG. 6, the storage system 10 may include a second storage assembly 170 configured to extend over the seating assemblies 16 and the rear seating space 18 and a cargo floor 172 in the cargo space 46. The base 14 extends over the rear surface 68 of the seatbacks 70 and along the cargo floor 172 to proximate a liftgate 174. The base 14 may be sized and shaped based on the configuration of the vehicle 12. The base 14 includes a first portion 176 that extends over the seating assemblies 16 and a second portion 178, which extends over the cargo floor 172. The first and second portions 176, 178 may support separate sections of the second storage assembly 170.

The first portion 176 is arranged in the rear seating space 18, similar to the first storage assembly 60. In the second storage assembly 170, the first partition 20 extends along the first edge 22 of the base 14 adjacent to the seating assemblies 42. The second partition 24 extends along the base 14 adjacent to the cargo space 46 between the first portion 176 and the second portion 178. In this way, the second partition 24 divides the rear seating space 18 from the cargo space 46. Generally, the first partition 20 is larger than the second partition 24, though each of the first and second partitions 20, 24 may be a similar shape. Similar to the first storage assembly 60, the first and second partitions 20, 24 extend parallel to one another. Additionally, the first and second partitions 20, 24 extend from proximate the seatbacks 70 to adjacent the headliner 34. Each of the first and second partitions 20, 24 generally have the transparent upper portions 80.

Sidewalls 180, 182 extend from opposing ends of the second partition 24. The sidewalls 180, 182 extend in the vehicle-rearward direction over the second portion 178 of the base 14. Generally, the first sidewall 180 extends along a first side edge 184 of the second portion 178 of the base 14, and the second sidewall 182 extends along an opposing second side edge 186 of the second portion 178 of the base 14. The sidewalls 180, 182 generally extend parallel to one another along a vehicle body 188 of the vehicle 12.

Referring still to FIG. 6, a dividing wall 190 may be disposed between the sidewalls 180, 182. The dividing wall 190 extends generally parallel to the sidewalls 180, 182. In the illustrated example, the dividing wall 190 extends in the vehicle-rearward direction from a central portion of the second partition 24 creating substantially equal storage spaces 192, 194 within the second storage assembly 170 proximate to the liftgate 174. The dividing wall 190 may be selectively added to and removed from the second storage assembly 170. When the dividing wall 190 is not included in the second storage assembly 170, a single storage space 196 may be disposed proximate to the liftgate 174. In this way, the second storage assembly 170 may include between two storage spaces 102, 196 and four storage spaces 104, 106, 192, 196 depending on the configuration of the second storage assembly 170. This may be advantageous for providing flexibility for storing items within the vehicle 12.

Side panels 200, 202 may be coupled to the first partition 20. The side panels 200, 202 may extend in the vehicle-forward direction from each end of the first partition 20 when the second storage assembly 170 is installed within the vehicle 12. The side panels 200, 202 may assist in filling the door openings 166 when the side doors 62, 64 are open. The user may access the storage space 102 defined by the storage assembly 170 and may not reach around the storage assembly 170 between the first partition 20 and the seating assemblies 42.

The storage assembly 170 also includes the end covers 130, 132 extending downward from the base 14. The end covers 130, 132 extend from the first edge 22 of the base 14 to proximate the second partition 24. The end covers 130, 132 also assist in filling the door opening 166. When the side doors 62, 64 are closed, the end covers 132, 134 may abut the side doors 62, 64, which may be advantageous for preventing items from moving between the seating assemblies 16 and the respective side door 62, 64 during vehicle maneuvers.

Referring still to FIG. 6, a cross feature 208 may extend between the two sidewalls 180, 182. The cross feature 208 generally extends between top edges of the sidewalls 180, 182, maximizing access to the storage spaces 192, 194. The cross feature 208 may also be coupled with the dividing wall 190. The second storage assembly 170 may include inner doors 210, 212 for selectively accessing the storage spaces 192, 194, respectively. The inner doors 210, 212 may be coupled with a cross feature 208 or elsewhere on the second storage assembly 170.

The cross member 28 is generally utilized to provide additional support and stability to the second storage assembly 170. The first partition 20, the second partition 24, and the dividing wall 190 may include the tabs 82 extending from the top edges 30, 32, 214 thereof, respectively. The cross member 28 defines the apertures 86 that align with the tabs 82. The tabs 82 may extend through the apertures 86 of the cross member 28 to provide support for the second storage assembly 170. In the illustrated example, the first partition 20 includes three tabs 82, the second partition 24 includes two tabs 82 and the dividing wall 190 includes one tab 82. The tab 82 on the dividing wall 190 is offset from and may extend normal to the tabs 82 on the second partition 24.

The cross member 28 may have a substantially “H” or “I” shape. In the configuration of the cross member 28 utilized with the second storage assembly 170, the end extensions 88, 90 may have different configurations. The rear end extension 90 may be wider to engage the tabs 82 on the second partition 24 and the dividing wall 190.

Figure 7:
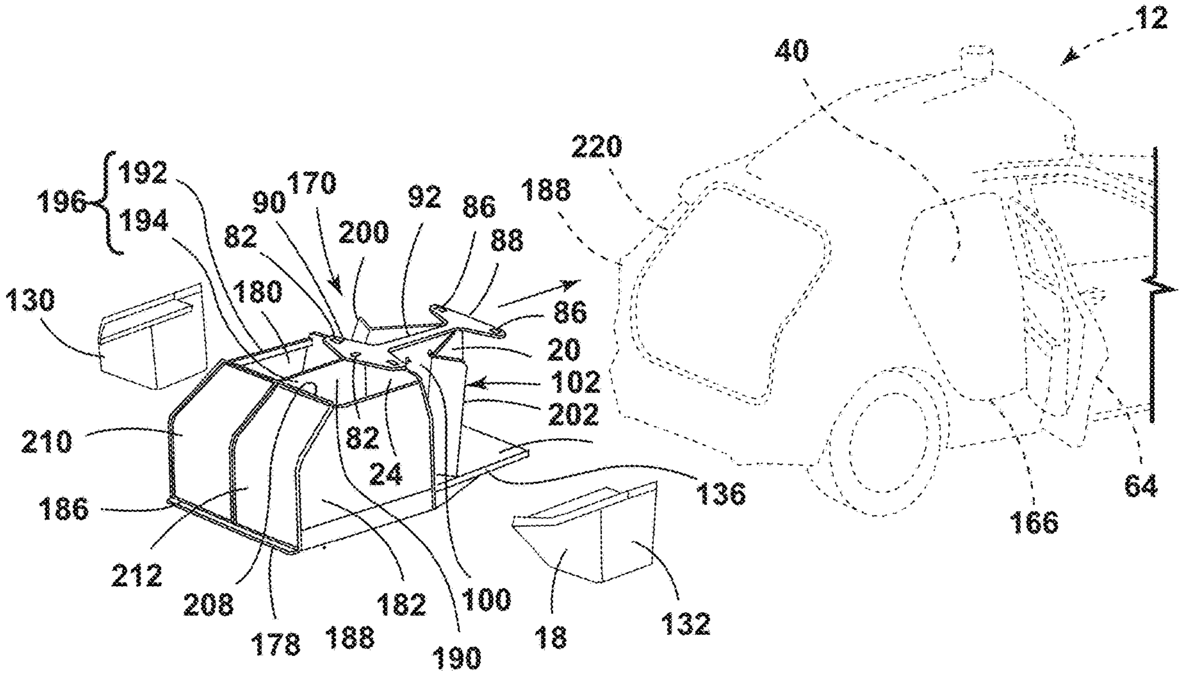
FIG. 7 is a rear perspective view of a storage assembly with end covers removed to be inserted into a vehicle, according to the present disclosure.
Figure 8:
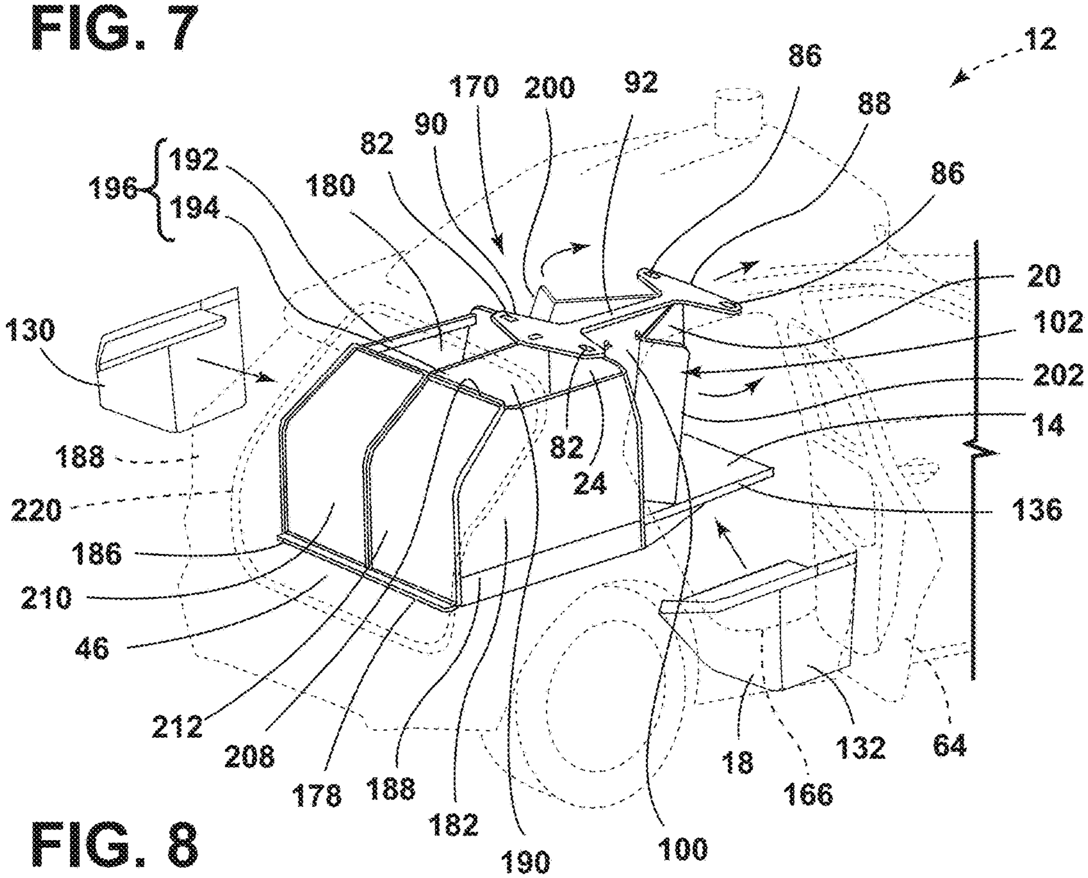
FIG. 8 is a rear perspective view of the storage assembly of FIG. 7 positioned within the vehicle, according to the present disclosure.

Referring still to FIG. 6, as well as FIGS. 7 and 8, the second storage assembly 170 may be substantially assembled prior to being inserted into the interior compartment 40. The first partition 20 is configured to bend along a centerline, bringing the side panels 200, 202 adjacent to the second partition 24. The base 14 with the folded first partition 20 may be inserted through a liftgate opening 220. Once the base 14 is in position with the first edge 22 disposed adjacent to the seating assemblies 42, the first partition 20 is configured to unfold. The first partition 20 may unfold automatically, or alternatively the user may manually unfold the first partition 20. The user may then secure the cross member 28 to the tabs 82 of the first partition 20. The end covers 130, 132 may then be coupled to the base 14 through the door openings 166. Once installed, the inner doors 210, 212 are disposed proximate to the liftgate opening 220.

Figure 9:
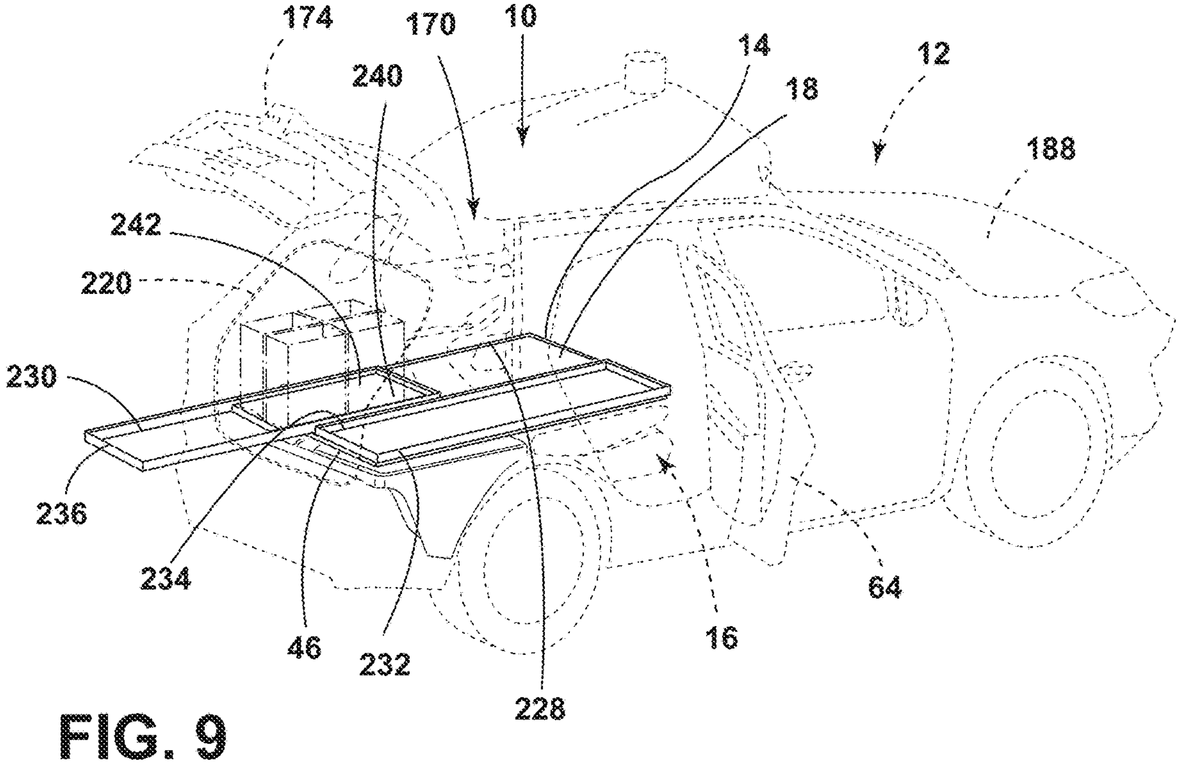
FIG. 9 is a side perspective view of a storage system having a first drawer in a deployed position and a second drawer in a stowed position, where the first drawer includes a slider in a first position, according to the present disclosure.
Figure 10:
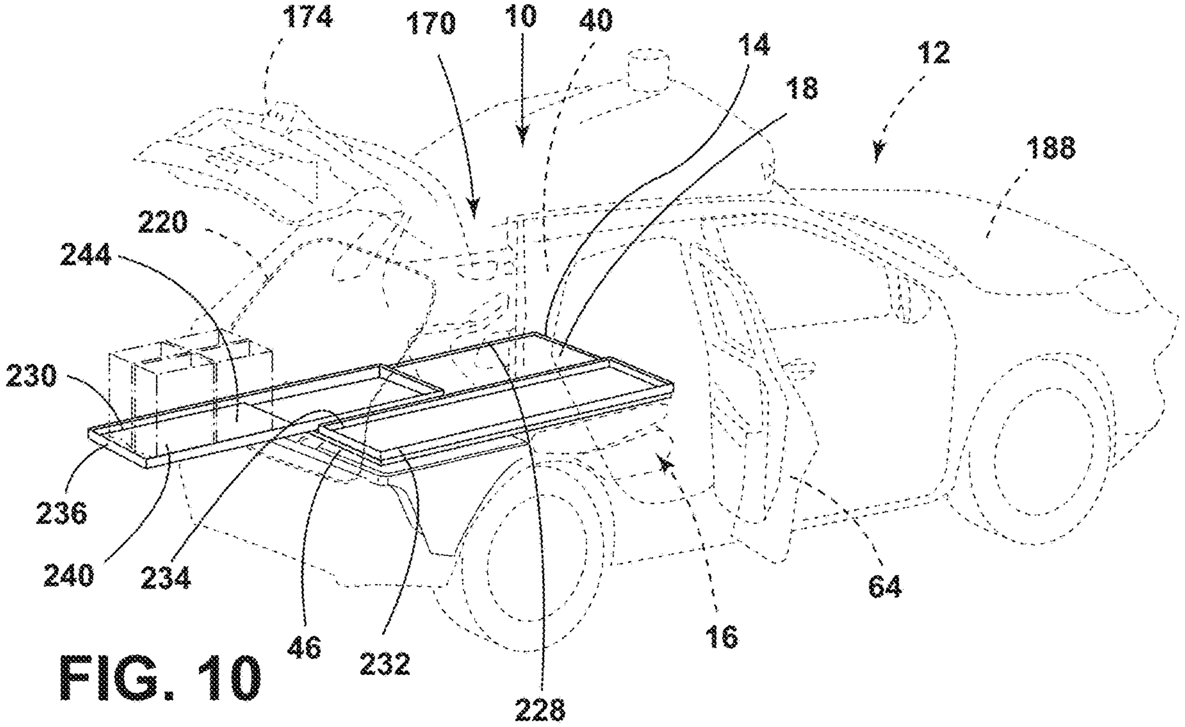
FIG. 10 is a side perspective view of a storage system having a first drawer in a deployed position and a second drawer in a stowed position, where the first drawer includes a slider in a first position, according to the present disclosure.

Referring to FIGS. 9 and 10, in additional or alternative configurations, the second storage assembly 170 may not include the second partition 24 and/or the dividing wall 190. Additionally, the second storage assembly 170 may or may not include the sidewalls 180, 182. This configuration provides for a single unified storage space 228, which includes the rear seating space 18 and the cargo space 46. The top surface 74 of the base 14 is generally a continuous planar surface, which is available for supporting larger structures that may extend through both the rear seating space 18 and the cargo space 46.

For example, drawers 230, 232 may be utilized with the second storage assembly 170. The drawers 230, 232 may be arranged in a side-by-side configuration. The drawers 230, 232 may be selectively added to or removed from the second storage assembly 170 based on the arrangement selected by the user. In the illustrated example, the drawers 230, 232 are operable between a stowed position 234, disposed entirely within the vehicle 12, and a deployed position 236, extending out of the vehicle 12 generally through the liftgate opening 220. When in the deployed position 236, the drawers 230, 232 may generally extend out of the vehicle 12 in a range between about 25 inches and about 35 inches. As illustrated, the drawers 230, 232 are configured to adjust in the fore-aft direction of the vehicle 12. Accordingly, the drawers 230, 232 generally extend over the first and second portions 176, 178 of the base 14 when in the stowed position 234 and extend over the second portion 178 when in the deployed position 236.

The drawers 230, 232 may include adjustment assemblies 238 for adjusting the drawers 230, 232 between the stowed and deployed positions 234, 236. The drawers 230, 232, including the adjustment assemblies 238, may be self-contained modules or assemblies disposed on the base 14. Accordingly, when the drawers 230, 232 are removed from the second storage assembly 170, the top surface 74 of the base 14 remains a substantially flat surface. It is contemplated that the adjustment assemblies 238 may be rail assemblies, motorized rail assemblies, gear assemblies, rack-and-pinion gear assemblies, etc.

The drawers 230, 232 may be used in combination with sliders 240 that are operable between a first position 242 and a second position 244. When in the first position 242, the slider 240 is positioned in a vehicle-forward portion of the drawer 230, which is further away from where the user may be positioned when removing the items from the vehicle 12. The user may slide the slider 240 along the drawer 230 in the vehicle-rearward direction to have increased access to the items that are on the slider 240. The sliders 240 may be used on either or both of the drawers 230, 232.

Figure 11:
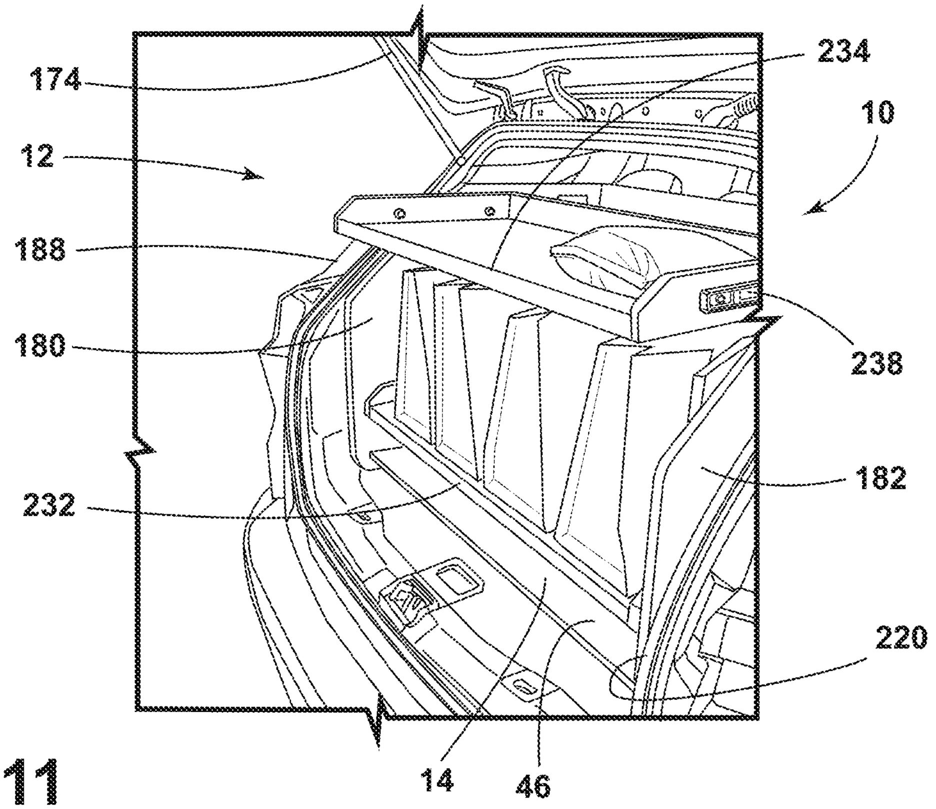
FIG. 11 is a rear perspective view of a storage assembly with upper and lower drawers in a cargo space of a vehicle, according to the present disclosure.
Figure 12:
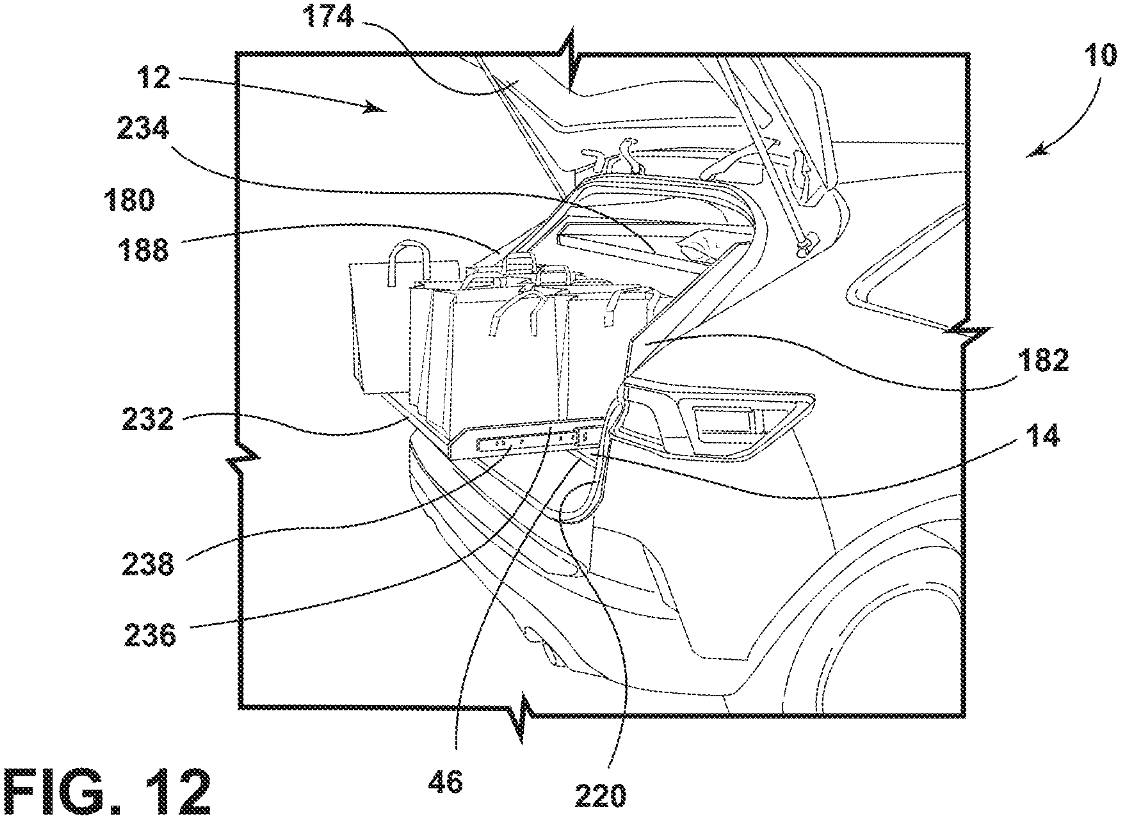
FIG. 12 is a rear perspective view of a storage assembly in a cargo space with an upper drawer in a stowed position and a lower drawer in a deployed position, according to the present disclosure.

Referring to FIGS. 11 and 12, in additional or alternative configurations, the second storage assembly 170 may include the two sidewalls 180, 182 and the second partition 24, but may not include the dividing wall 190. This configuration allows the single storage space 196 to be utilized. The drawers 230, 232 may be utilized with the single storage space 102. The drawers 230, 232 may be each coupled to both of the sidewalls 180, 182. The drawers 230, 232 may then be arranged as upper and lower drawers that are independently adjustable between the stowed position 234 and the deployed position 236. The drawers 230, 232 may be self-contained assemblies, such that when the drawers 230, 232 are removed from the storage assembly 170, the sidewalls 180, 182 have generally flat surfaces.

It is contemplated that at least one of the drawers 230, 232 and the sliders 240 may be manually actuated, automatically actuated, or a combination thereof (e.g., a hybrid configuration). In manual configurations, the user may apply pushing and pulling forces to adjust the drawers 230, 232 or the sliders 240. In automatic configurations, motorized assemblies (e.g., rail assemblies, gear assemblies, etc.) may be utilized for adjusting the drawers 230, 232 or the sliders 240. The drawers 230, 232 may be triggered to adjust to the deployed position 236 upon opening of the liftgate 174 or a user input on a user interface. In the hybrid configuration, the drawers 230, 232 may be manually adjusted to the deployed position 236 and then automatically adjusted to the stowed position 234. This configuration may be advantageous for reducing interference between the drawers 230, 232 and the liftgate 174 if the user does not manually close the drawers 230, 232. The sliders 240 may be adjusted to the second position 244 upon removing items blocking the slider 240 (e.g., items on the vehicle-rearward portion of the drawer 230, 232) or upon a user input from the user interface.

The second storage assembly 170 may be coupled to various locations within the vehicle 12. Generally, the base 14 is directly coupled to the vehicle 12, while other components of the second storage assembly 170 may not be directly coupled to the vehicle 12. In this way, the engagement points may be between the base 14 and the vehicle 12.

Referring to FIGS. 6-12, the second storage assembly 170 may provide two separate storage areas that may be selectively and independently accessed by the user. The first storage assembly 60 may be in the rear seating space 18 and can be accessed through the door openings 166. The second storage assembly 170 may be disposed within the cargo space 46 of the vehicle 12 and may be accessed via the liftgate opening 220. The configuration of the second storage assembly 170 provides flexibility in storing items in the vehicle 12 and granting access to the various storage spaces 102, 196 of the second storage assembly 170.

Figure 13:
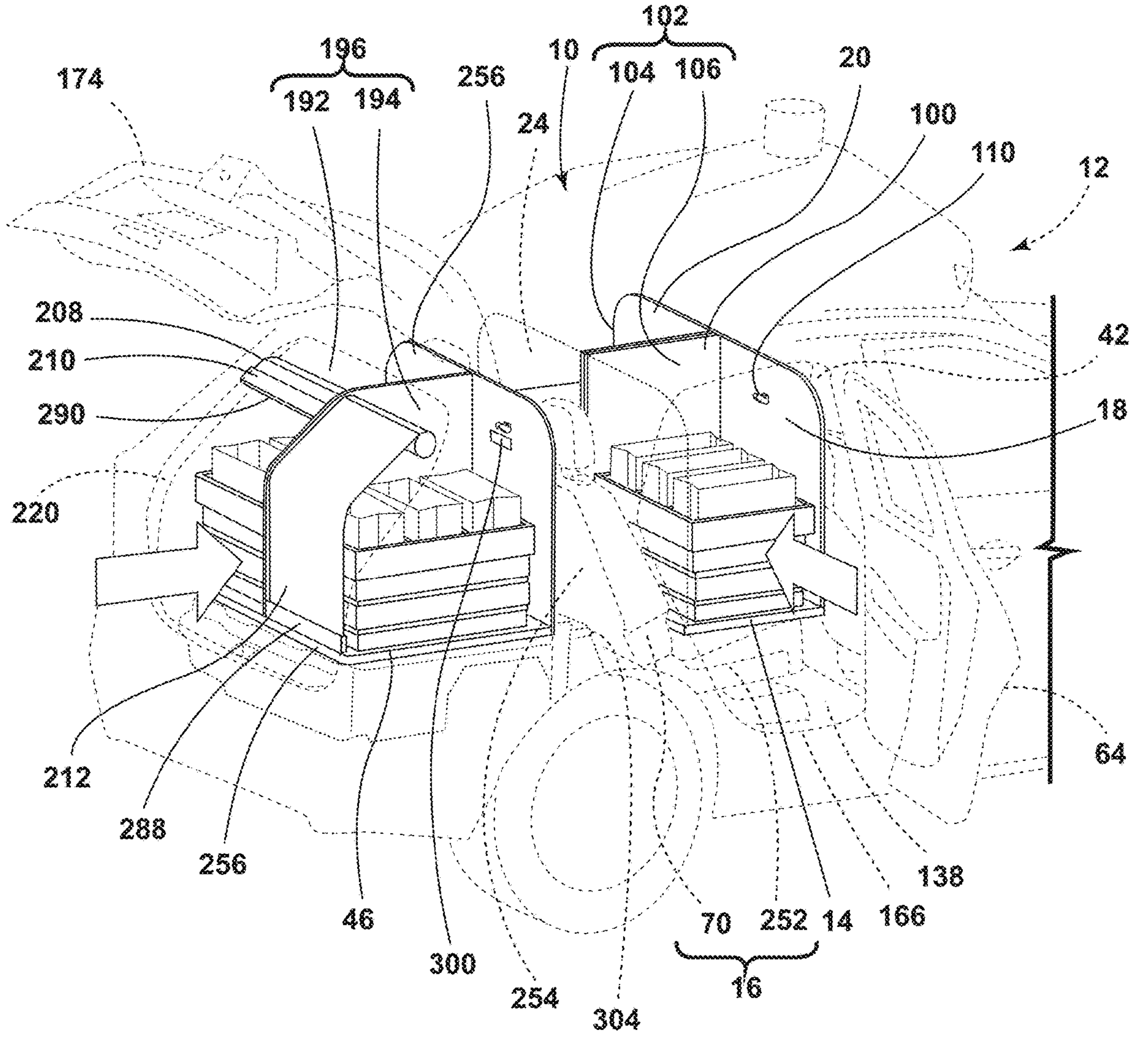
FIG. 13 is a side perspective view of a storage system having a first storage assembly in a rear seating space and a second storage assembly in a cargo space, according to the present disclosure.

Referring to FIG. 13, the storage system 10 may include two separate storage assemblies 60, 250. The first and third storage assemblies 60, 250 may provide similar storage areas as the combined second storage assembly 170. In the illustrated configuration of FIG. 13, the first storage assembly 60 is disposed on a seat base 252 with each of the seating assemblies 16 in the rear seating space 18. The seating assemblies 16 are in a raised position 254. In such configurations, the seatbacks 70 may be disposed between the first storage assembly 60 and the third storage assembly 250. The first storage assembly 60 is substantially similar as described with respect to FIGS. 2-5, with the base 14 disposed on the seat bases 252 and the second partition 24 disposed adjacent to the seatbacks 70.

The third storage assembly 250 generally includes a base 256 and a support wall 258 extending from a vehicle-forward edge of the base 256. The base 256 extends over the cargo floor 172 of the cargo space 46. The support wall 258 extends in the cross-car direction and is spaced on an opposing side of the seatbacks 70 of the seating assemblies 16 relative to the second partition 24. The support wall 258 is disposed adjacent to the seatbacks 70 and extends generally parallel to the second partition 24. The dividing wall 190 extends from a central location of the support wall 258 to form the two storage spaces 192, 194 adjacent to the liftgate 174. It is contemplated that the dividing wall 190 may not be included, providing for the single storage space 196 proximate to the liftgate 174. The third storage assembly 250 may not include the sidewalls 180, 182, or alternatively may include the sidewalls 180, 182 without departing the teachings herein.

The cross feature 208 is coupled to the dividing wall 190 and/or the sidewalls 180, 182 and extends generally parallel to the support wall 258. The third storage assembly 250 may include one or two inner doors 210, 212 coupled to the cross feature 208. The inner doors 210, 212 may be advantageous for selectively allowing access to the storage spaces 192, 194.

Referring still to FIG. 13, the storage system 10 may include one or both of the first storage assembly 60 and the third storage assembly 250 at any given time based on the selected configuration of the user. The first storage assembly 60 provides for storage areas within the rear seating space 18 and the third storage assembly 250 provides for storage areas within the cargo space 46. The first storage assembly 60 may be inserted into the vehicle 12 through the door openings 166 and the third storage assembly 250 may be inserted through the liftgate opening 220. The first and third storage assemblies 60, 250 may provide for flexible implementations of various storage areas within the vehicle 12.

Figure 14:
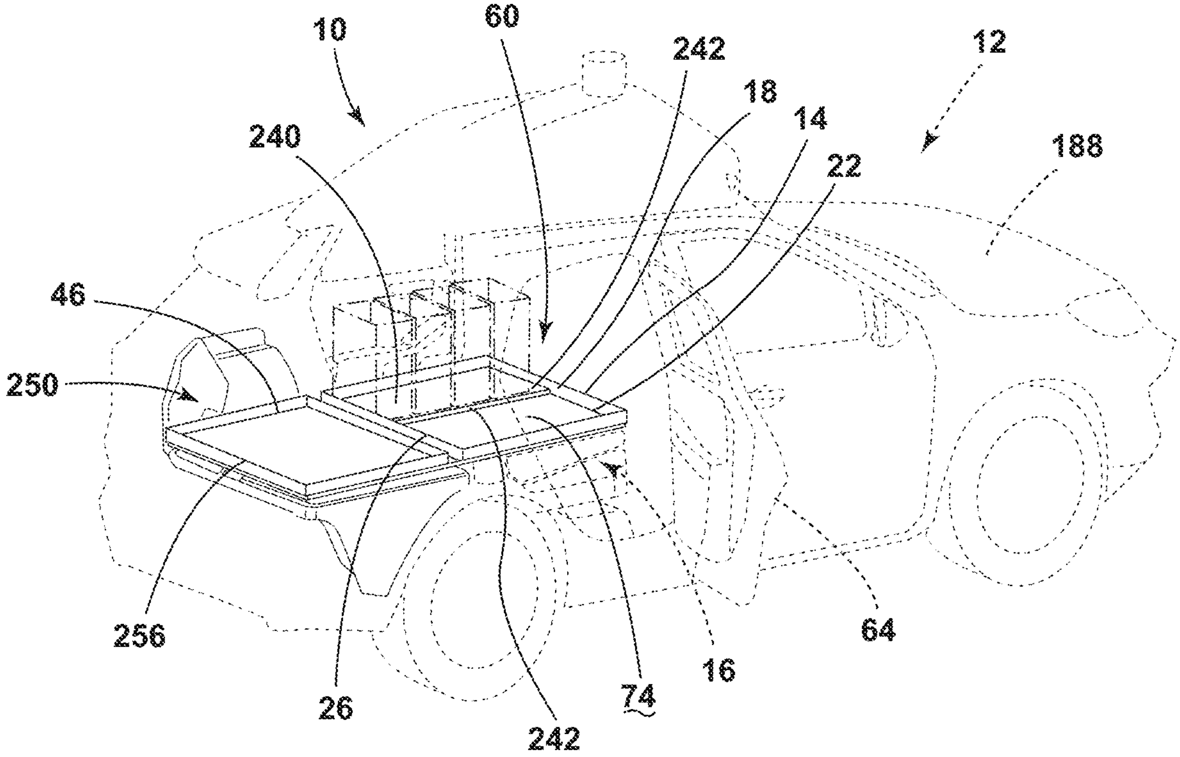
FIG. 14 is a side perspective view of a storage system having two storage assemblies, where one storage assembly includes a slider in a first position, according to the present disclosure.
Figure 15:
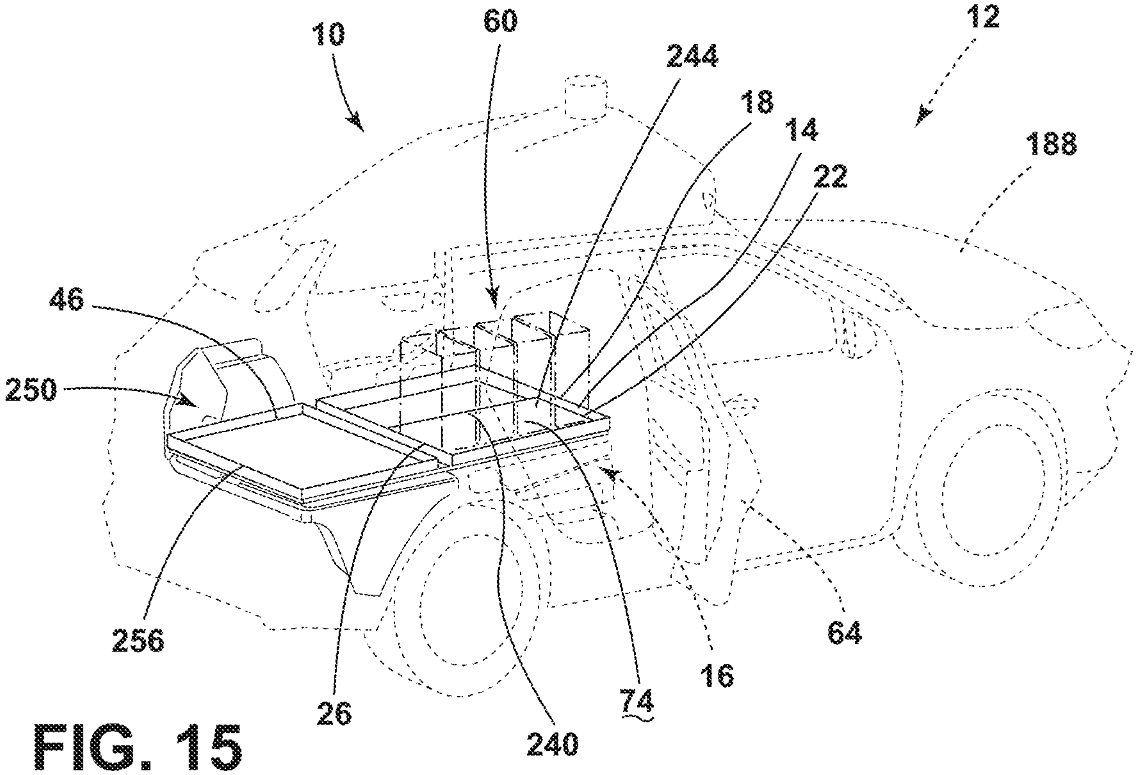
FIG. 15 is a side perspective view of a storage system having two storage assemblies, where one storage assembly includes a slider in a second position, according to the present disclosure.

Referring to FIGS. 14 and 15, either of the first storage assembly 60 and the third storage assembly 250 may also utilize the sliders 240. In the illustrated configuration, the slider 240 is positioned in the first storage assembly 60. When making deliveries, the vehicle 12 may often park proximate to a curb or on the right side of the road with a passenger side more accessible to the user. A driver-side of the vehicle 12 may be disposed proximate to moving traffic. The user may want to access the first storage assembly 60 from the passenger side of the vehicle 12. Therefore, the portion of the base 14 on the driver-side of the vehicle 12 may be more difficult to reach from the door opening 166 on the passenger side. The items originally placed on the driver-side of the first storage assembly 60 may be positioned on the slider 240. Once items on the passenger side are removed from the first storage assembly 60, the user may pull or actuate the sliders 240 to move the sliders 240 across the top surface 74 of the base 14 to the second position 244 on the passenger side of the first storage assembly 60. The sliders 240 may also be utilized within the third storage assembly 250 to adjust items on the slider 240 in the cross-car and/or fore-aft directions.

Referring to FIGS. 13-15, the third storage assembly 250 may provide two separate storage areas that may be selectively and independently accessed by the user. The first storage area may be provided by the first storage assembly 60 in the rear seating space 18 and can be accessed through the door openings 166. The second storage area may be provided by the third storage assembly 250 and may be disposed within the cargo space 46 of the vehicle 12 to be accessed via the liftgate opening 220. The configuration of the first and third storage assemblies 60, 250 provide flexibility in storing items in the vehicle 12 and granting access to the various storage spaces 102, 196.

Figure 16:
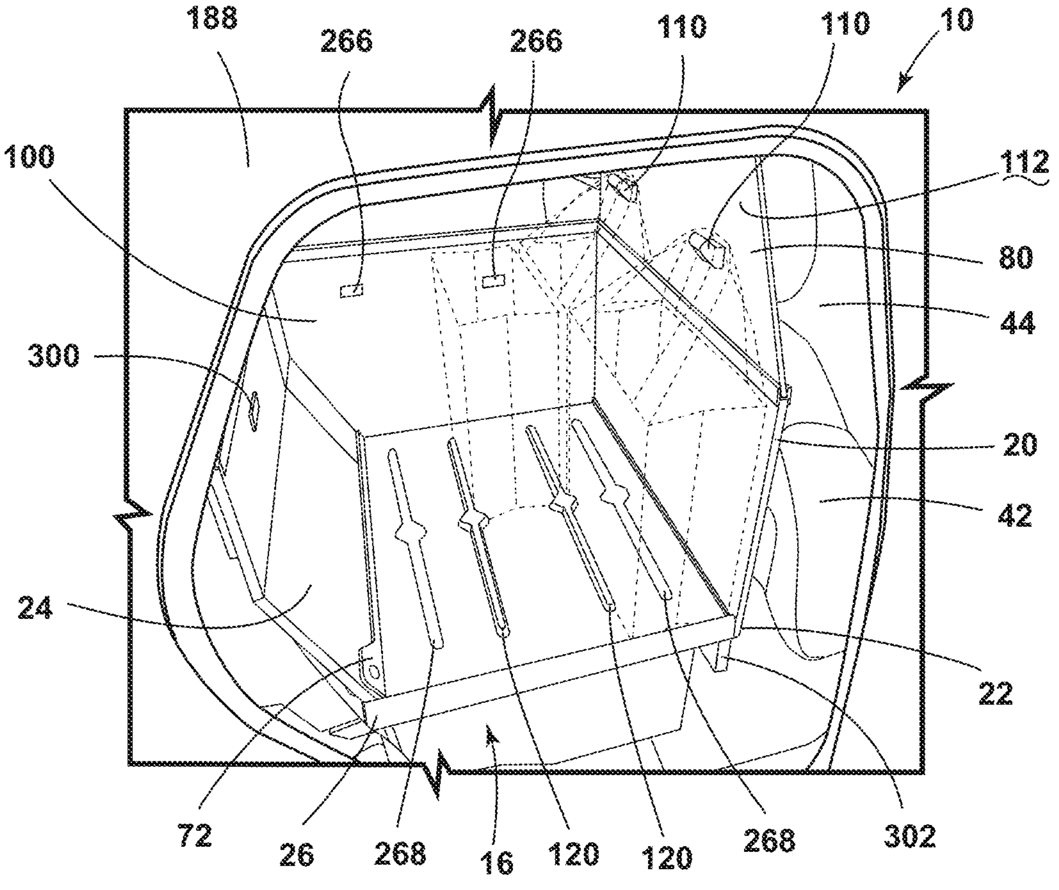
FIG. 16 is a side perspective view of a storage assembly having hooks and slide stops, according to the present disclosure.

Referring to FIG. 16, the first storage assembly 60 is illustrated with additional retention features, such as the hooks 110 and the slide stops 120, for retaining items in selected positions. The inner surface 112 of the first partition 20 may include the hooks 110 for hanging or securing items, such as handles of bags. Each of the hooks 110 may be added to or removed from the storage system 10. For example, as illustrated in FIG. 16, the hooks 110 have been removed from the divider 100 and replaced with hook caps 266. The hook caps 266 may replace the hooks 110 to create a substantially flat surface.

Additionally, the base 14 may include the slide stops 120, which extend in the cross-car direction to assist in retaining the items in the position during vehicle maneuvers. Each of the slide stops 120 may be added to or removed from the storage system 10. The slide stops 120 may be removed from the base 14 and replaced with a slide stop cap 268, which provides a substantially flat top surface 74 of the base 14. The removal of the slide stops 120 may provide greater flexibility for varying item sizes and positions. These additional retention features (e.g., the hooks 110 and the slide stops 120) may also be utilized in either or both of the storage spaces 102, 196 of the second storage assembly 170, and/or in the third storage assembly 250.

Figure 17:
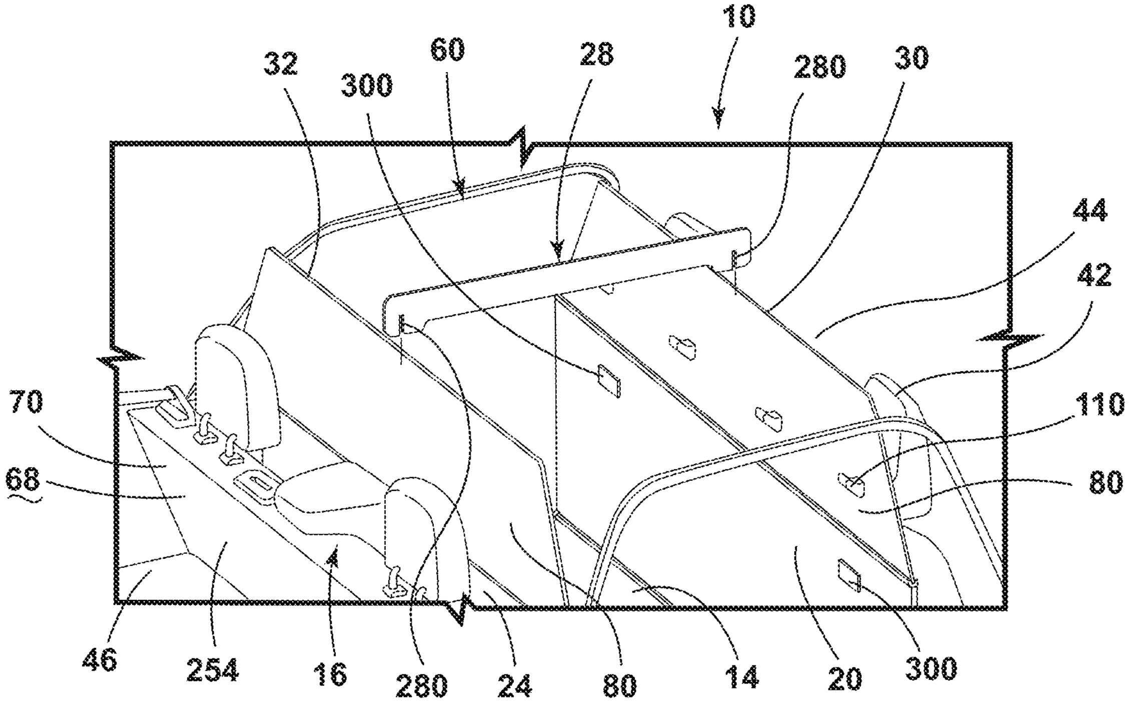
FIG. 17 is a top perspective view of a storage assembly with a cross member that engages top edges of portions of the storage assembly, according to the present disclosure.
Figure 18:
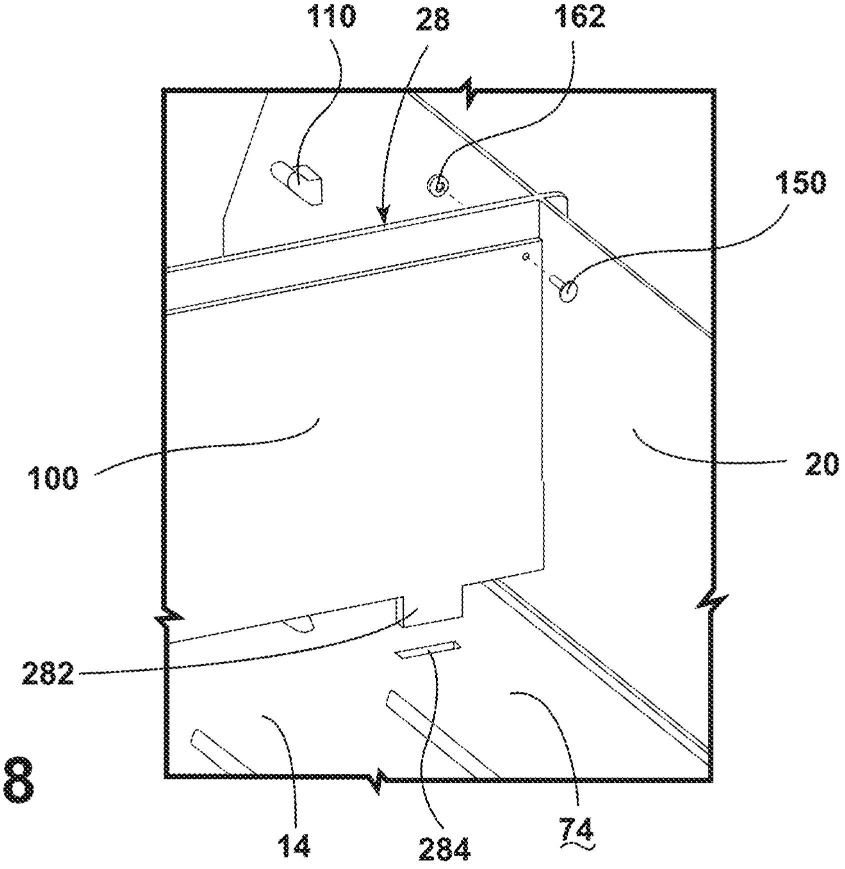
FIG. 18 is a side perspective view of a divider engaging a base and a cross member of a storage assembly, according to the present disclosure.

Referring to FIGS. 17 and 18, with the first storage assembly 60, the cross member 28 may have an additional or alternative configuration. The cross member 28 may define notches 280 for receiving the top edges 30, 32 of the first and second partitions 20, 24. The cross member 28 illustrated in FIGS. 17 and 18 extends vertically, slightly into the storage space 102 defined between the first and second partitions 20, 24. The divider 100 may abut the cross member 28 and may be coupled thereto via the fastener 150 and the nut 162.

The divider 100 is also generally coupled to the base 14. The divider 100 may include coupling extensions 282 that are received in slots 284 defined by the base 14. The coupling extensions 282 may be positioned within the slots 284 retaining the divider 100 in the selected position. An opposing side of the divider 100 may then be fastened to the cross member 28. Accordingly, the divider 100 may be engaged in two locations to the first storage assembly 60, which may be advantageous for retaining the divider 100 in the selected position as items are shifted against the divider 100 during vehicle maneuvers. Further, the divider 100 may be installed and removed without the use of tools.

Figure 19:
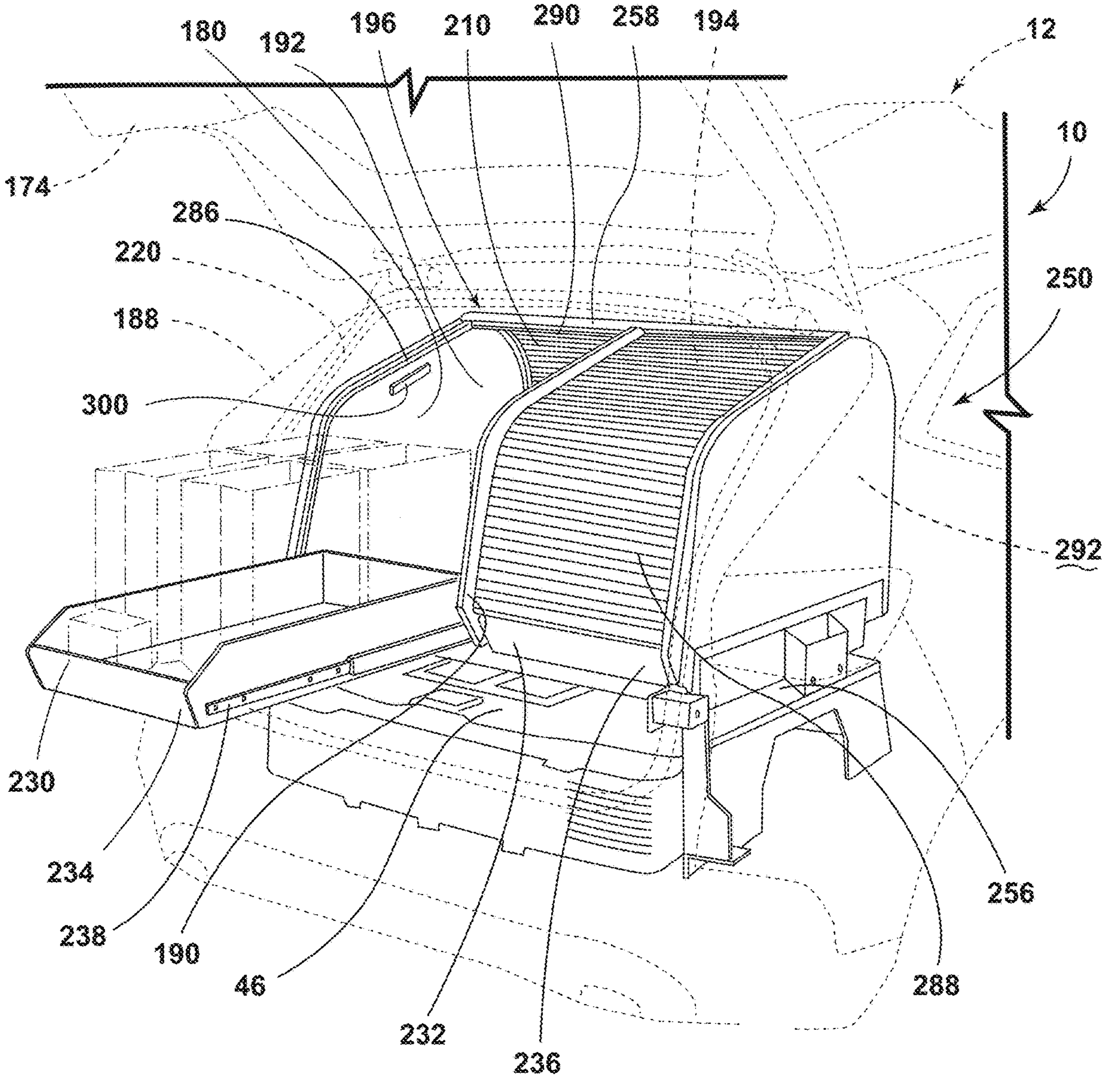
FIG. 19 is a side perspective view of a storage assembly with a first inner door in an opened position and a drawer in a deployed position and a second inner door in a closed position, according to the present disclosure.
Figure 20:
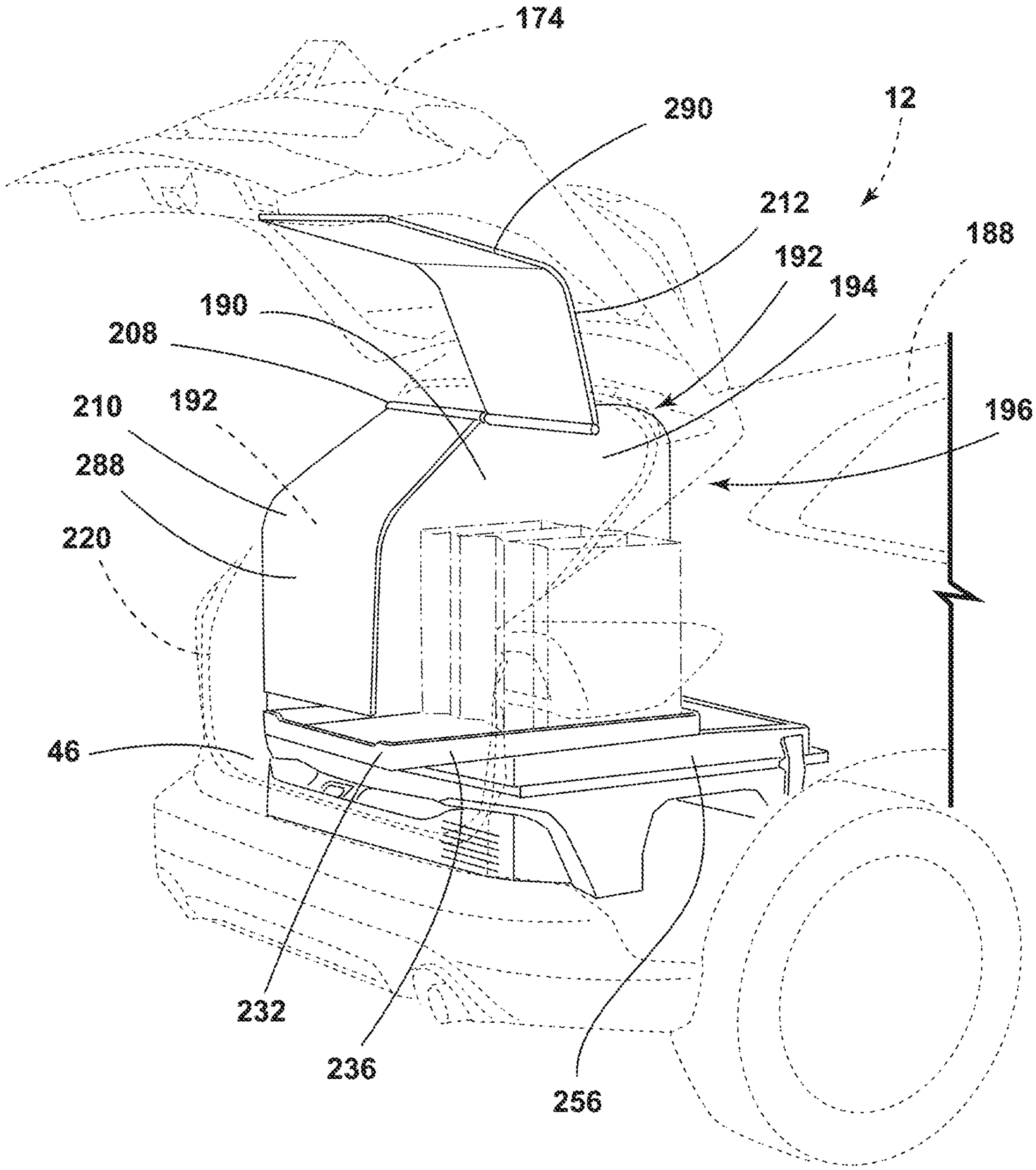
FIG. 20 is a side perspective view of a storage assembly with a first inner door in an opened position and a drawer in a deployed position and a second inner door in a closed position, where the first inner door is coupled to a liftgate, according to the present disclosure.

Referring to FIGS. 19 and 20, the third storage assembly 250 is illustrated with the drawers 230, 232 arranged in a side-by-side configuration. In the illustrated configuration of FIG. 19, the third storage assembly 250 may include the dividing wall 190, but not the cross feature 208. The inner doors 210, 212 may be coupled to the support wall 258, the respective sidewalls 180, 182, and the dividing wall 190 to selectively enclose the storage spaces 192, 194. The sidewalls 180, 182 and the dividing wall 190 may each include tracks 286 that engage opposing sides of the inner doors 210, 212, respectively. The inner doors 210, 212 may travel along the tracks 286 from a closed position 288, preventing access to the respective storage spaces 192, 194, to an opened position 290, abutting a rear surface 292 of the support wall 258 and providing access to the respective storage spaces 192, 194. The inner doors 210, 212 may then travel along the tracks 286 in an opposing direction to return to the closed position 288. Other configurations of the inner doors 210, 212 may be utilized without departing from the teachings herein.

Referring still to FIG. 20, in an additional or alternative configuration, the inner doors 210, 212 may be coupled to the liftgate 174. Accordingly, as liftgate 174 opens, the inner doors 210, 212 may be adjusted to the opened position 290, and as the liftgate 174 closes, the inner doors 210, 212 may be adjusted to the closed position 288. The inner doors 210, 212 may be selectively coupled to the liftgate 174, thereby allowing selective access to the storage spaces 192, 194. The inner doors 210, 212 may automatically couple with the liftgate 174 via biasing forces, for example with magnets, or a locking mechanism. One of the inner doors 212 may be opened to access the storage space 194 while the other of the inner doors 210 remain in the closed position 288. The drawers 230, 232 and the inner doors 210, 212 described with respect to FIGS. 19 and 20 may also be included on the second storage assembly 170. Moreover, for each of the second and third storage assemblies 170, 250, a single inner door may be utilized rather than the two inner doors 210, 212 without departing from the teachings herein. For example, the inner doors 210, 212 may be retracted into a coiled or folded position when closed and extending when opened (see FIG. 13), rotated in various direction relative to the vehicle 12, etc.

Additionally, the storage system 10 may include light sources 300 disposed in various locations on the storage assemblies 60, 170, 250. At least one light source 300 may be disposed in each storage space 104, 106, 192, 194. The light source 300 for the selected storage space 104, 106, 192, 194 may be activated to provide greater visibility into the storage assemblies 60, 170, 250 of the storage system 10. When multiple storage spaces 104, 106, 192, 194 are accessed together or when the divider 100 and/or the dividing wall 190 are not utilized, multiple light sources 300 may be activated simultaneously. Additionally or alternatively, when the items are initially being positioned in the vehicle 12 prior to deliveries, each of the light sources 300 may be activated to provide greater visibility when loading the items.

In various examples, the light sources 300 may emit visible light that has a wavelength in a range from about 380 nm to about 740 nm, or a mix of wavelengths in this range. The light source 300 may include any form of light source, for example, fluorescent lighting, light-emitting diodes (LEDs), organic LEDs (OLEDs), polymer LEDs (PLEDs), laser diodes, quantum dot LEDs (QD-LEDs), solid-state lighting, a hybrid, and/or any other similar device. Any other form of lighting may be utilized within the vehicle 12 without departing from the teachings herein. Further, various types of LEDs are suitable for use as the light source 300, including, but not limited to, top-emitting LEDs, side-emitting LEDs, and others. According to various examples, multicolored light sources, such as Red, Green, and Blue (RGB) LEDs that employ red, green, and blue LED packaging may be used to generate various desired colors of light output from a single light source, according to known light color mixing techniques. Moreover, the light sources 300 may be configured as a single light source, or alternatively, as more than one light source that can be selectively and independently controlled. Moreover, the light sources 300 may emit any wavelength of light for illuminating the interior compartment 40 of the vehicle 12.

Referring to FIGS. 1-20, the storage system 10 provides for increased flexibility for configuring the interior compartment 40 of the vehicle 12. The first, second, and third storage assemblies 60, 170, 250 may be selectively and interchangeably utilized within the vehicle 12. This may allow the vehicle 12 to be conveniently adjusted between transporting people and transporting goods. Each of the storage assemblies 60, 170, 250 may be conveniently installed and removed from the vehicle 12.

The storage assemblies 60, 170, 250 may have several engagement points between the bases 14, 256 and the vehicle 12, respectively. For example, the base 14 of the first and second storage assemblies 60, 170 may be coupled to a vehicle-forward portion of the seat base 252 of the seating assemblies 16, a vehicle-rearward portion of the seat base

252 of the seating assemblies 16, the seat base 252 of the seating assemblies 16, tether points of the seating assemblies 16, latches of the seating assemblies 16, or elsewhere in the vehicle 12. The bases 14, 256 of the second and third storage assemblies 170, 250 may be coupled in corners of the cargo space 46 or elsewhere in the vehicle 12. In certain aspects, straps may be utilized to couple the storage assemblies 60, 170, 250 to various vehicle structures. In such examples, the straps may be looped through the vehicle structures, which may be, for example, seatback tether points or a bottom of a seat frame. It is also contemplated that any of the storage assemblies 60, 170, 250 may be coupled to other components of the vehicle 12, directly or indirectly, without departing from the teachings herein.

Each of the storage assemblies 60, 170, 250 may also include a retaining extension 302 extending from an underside of the base 14 adjacent to the first edge 22. For the first and second storage assemblies 60, 170, the retaining extension 302 may extend vertically downward to engage the seatback 70 of the seating assemblies 16 when in the lowered position 66 or the seat base 252 of the seating assemblies 16 when in the raised position 254. For the third storage assembly 250, the retaining extension 302 may extend into a space or groove 304 defined between the seating assemblies 16 and the cargo space 46. The retaining extension 302 may reduce or limit movement of the storage assemblies 60, 170, 250 in the fore-aft direction.

The storage assemblies 60, 170, 250 may be constructed of lightweight, yet rigid materials which allows the storage assemblies 60, 170, 250 to support various items and the user to easily interchange the storage assemblies 60, 170, 250. In various examples, the storage assemblies 60, 170, 250 may be constructed of panels having a honeycomb or corrugated core. In additional or alternative examples, the storage assemblies 60, 170, 250 may be constructed of structurally insulated panels having a foam core disposed between outer layers.

The storage assemblies 60, 170, 250 may also provide increased flexibility based on the OR VEHICLE SEATING ASSEMBLY (Our Ref: FOR025 P2931) various additional features that can be added to or removed for the storage assemblies 60, 170, 250. For example, the divider 100 may be utilized in the first storage assembly 60 and the second storage assembly 170 to divide the storage area within the rear seating space 18. Additionally, in both the second storage assembly 170 and the third storage assembly 250, a storage area within the cargo space 46 may be a single space 196 or divided into separate storage spaces 192, 194. Further, the drawers 230, 232 may be utilized in each of the storage assemblies 60, 170, 250. The drawers 230, 232 may be arranged in side-by-side configurations or vertically stacked configurations. The drawers 230, 232 may extend a portion of the storage space 102, 196, for example, when used with the divider 100 or the dividing wall 190, or may extend along an entirety of the storage space 102, 196. The drawers 230, 232 may also be disposed in the rear seating space 18, the cargo space 46, or a combination thereof. Further, each of the storage assemblies 60, 170, 250 may utilize the sliders 240 for moving items closer to the user and shortening a reach of the user to grasp the items. Moreover, each of the storage assemblies 60, 170, 250 may utilize one or both of the hooks 110 and the slide stops 120. Also, each of the storage assemblies 60, 170, 250 may utilize multiple light sources 300 for illuminating the various storage spaces 104, 106, 192, 194, respectively.

In various examples, aspects of the storage assemblies 60, 170, 250 may be automatically adjusted in tandem. For example, when the inner doors 210, 212 are moving to the opened position 290, the drawers 230, 232 may move to the deployed position 236. Each of the configurations of the drawers 230, 232 may include a soft-close feature. For example, when the drawers 230, 232 are manually actuated, the drawers 230, 232 may have a dampening feature for providing a soft close effect of the drawers 230, 232. In automatic configurations of the drawers 230, 232, the adjustment assembly 238 may travel at a first speed until approaching the stowed position 234 and then may proceed at a slower speed providing a soft close effect.

It is contemplated that the storage system 10 may be utilized with additional automatic features, such as automatic side doors 62, 64 and an automatic liftgate 174. For example, when the vehicle 12 approaches the user, the side doors 62, 64 or the liftgate 174 may open automatically to provide access to the selected storage space 102, 196. With the automatic opening of the doors 62, 64, the inner doors 210, 212 and/or the drawers 230, 232 may be automatically adjusted. Further, the light sources 300 may also be activated to provide the illumination for the selected storage space 102, 196.

Use of the present device may provide for a variety of advantages. For example, multiple storage assemblies 60, 170, 250 may be quickly and conveniently installed and removed from the vehicle 12. Further, the storage system 10 may be modular such that various features may be interchanged by the user. Additionally, the storage system 10 may provide between one and four storage spaces depending on the configuration of the storage system 10. Also, the storage system 10 may use drawers 230, 232 and/or sliders 240 to provide easier access to the items in the vehicle 12. Moreover, the storage system 10 may be installed without the use of any tools, which may provide quicker and more convenient installation. Further, the storage system 10 allows easy transition between transporting people in the vehicle 12 and transporting goods in the vehicle 12. Each of the storage assemblies 60, 170, 250 may be lightweight and convenient to install. Further, the storage assemblies 60, 170, 250 maximize the storage area within the vehicle 12. Additional benefits or advantages may be realized and/or achieved.

According to various examples, a vehicle storage system includes a base that is configured to be disposed on seating assemblies within a rear seating space. A first partition is coupled to the base, and the first partition extends along a first edge of the base. A second partition is spaced from the first partition, and the second partition is coupled to the base and extends along a second opposing edge of the base. A cross member is coupled to a top edge of each of the first partition and the second partition, and the cross member extends adjacent to a headliner. Embodiments of the present disclosure may include one or a combination of the following features:

- the first edge is a vehicle-forward edge and the second opposing edge is a vehicle-rearward edge;
- the first partition and the second partition each extend from proximate to the base to proximate to the headliner;
- the base has a first height at the vehicle-forward edge and a second height at the vehicle-rearward edge;
- the first height is less than the second height;
- a divider is selectively coupled to the base and extends above a top surface of the base for retaining items that are positioned on the base within a selected position;
- hooks are coupled to an inner surface of the first partition;

the base is configured to be disposed on a rear surface of the seating assemblies and a floor of a cargo space;

an end cover is coupled to each side end of the base;

each end cover extends from the base in an opposing direction relative to the first partition and the second partition;

a slider slidably engages a top surface of the base; and/or the slider may be adjusted from one side of the base to an opposing side of the base for accessing items on the slider.

According to various examples, a vehicle storage system includes a base that has a first portion that is configured to extend along a surface of seating assemblies and a second portion that is configured to extend along a floor of a cargo space. A first partition extends along an edge of the base. A second partition extends parallel to the first partition and along the base between the seating assemblies and the cargo space. A cross member is coupled to a top edge of each of the first partition and the second partition. A first sidewall is coupled to the second portion of the base, and the first sidewall extends along a first side edge of the base. A second sidewall is coupled to the second portion of the base, and the second sidewall extends along a second side edge of the base that opposes the first side edge. Embodiments of the present disclosure may include one or a combination of the following features:

a divider extends between the first partition and the second partition;

the divider is selectively coupled to the cross member;

a first drawer is disposed adjacent to at least the first sidewall;

a second drawer is disposed adjacent to at least the second sidewall;

the first drawer and the second drawer are selectively adjustable between a deployed position and a stowed position;

the first drawer and the second drawer are arranged in a side-by-side configuration;

the first drawer is an upper drawer and the second drawer is a lower drawer that is disposed below the upper drawer;

a cross feature is coupled to and extends between the first sidewall and the second sidewall; and/or an inner door is coupled to the cross feature and is configured to selectively provide access to at least a portion of a space over the second portion of the base.

According to various examples, a storage system for a vehicle includes a first storage assembly that is configured to be disposed in a seating space of said vehicle. The first storage assembly includes a first base that has a first edge and a second opposing edge, a first partition that extends along the first edge of the first base, and a second partition that extends along the second opposing edge of the first base. A second storage assembly is configured to be disposed in a cargo space of said vehicle. The second storage assembly includes a second base that has a first side edge and a second side edge opposing the first side edge, a support wall that extends between the first side edge and the second side edge, a dividing wall that extends from a support wall, and a cross feature that is coupled to the dividing wall and extends parallel to the support wall. Embodiments of the present disclosure may include one or a combination of the following features:

an inner door is coupled to the cross feature;

the inner door is operable between an opened position and a closed position to selectively allow access to at least a portion of the second storage assembly;

the inner door is coupled to a liftgate of said vehicle;

the inner door is configured to be adjusted to the opened position as the liftgate opens;

the second storage assembly includes a first drawer that is coupled to the second base on a first side of the dividing wall and a second drawer that is coupled to the second base on a second side of the dividing wall; and/or the first storage assembly includes slide stops that are selectively coupled to a top surface of the first base.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle storage system, comprising:

a first seating assembly having a first rear surface and a second seating assembly having a second rear surface;

a cargo space proximate the second seating assembly;

a base extending from the first seating assembly and toward a vehicle liftgate, wherein the base includes a first base portion extending from the first rear surface of the first seating assembly over the second rear surface of the second seating assembly and a second base portion extending from the second rear surface toward the vehicle liftgate;

a first partition extending along an edge of the base proximate the first rear surface of the seating assembly, wherein a first storage space is defined at least partially by the first partition and over the second seating assembly;

a second partition extending parallel to the first partition and proximate the second seating assembly, wherein a second storage space is at least partially defined by the second partition within the cargo space;

a first divider wall extending from the first partition across the first storage space; and a second divider wall extending from the second partition across the second storage space.

2. The vehicle storage system of claim 1, wherein the first divider wall extends from the first partition between the first seating assembly and the second seating assembly and the second divider wall extends from the second partition between the second seating assembly and the vehicle liftgate.

3. The vehicle storage system of claim 2, wherein a third partition extends along the base adjacent to the cargo space between the first base portion and the second base portion, and wherein the first storage space is defined between the first partition and the third partition.

4. The vehicle storage system of claim 3, wherein each of the first partition, the second partition, and the third partition extend parallel to one another, and wherein the first partition extends from proximate the first seating assembly to adjacent a headliner, and wherein the second and third partitions extend from proximate the second seating assembly to adjacent the headliner.

5. The vehicle storage system of claim 2, further comprising:

a first sidewall and a second sidewall extending from opposing ends of the second partition, and wherein the first sidewall and the second sidewall extend over the second base portion.

6. The vehicle storage system of claim 5, wherein the base includes a first side edge and a second side edge, and wherein the first sidewall extends along the first side edge from a first one of the opposing ends of the second partition and the second sidewall extends along the second side edge from a second one of the opposing ends of the second partition.

7. The vehicle storage system of claim 5, wherein the second divider wall is positioned between the first sidewall and the second sidewall, and wherein the second divider wall is parallel to and spaced apart from the first sidewall and the second sidewall.

8. A vehicle storage system comprising:

a first seating assembly having a first rear surface and a second seating assembly having a second rear surface;

a cargo space proximate the second seating assembly;

a base extending from the first seating assembly and toward a vehicle liftgate;

a first partition extending along an edge of the base proximate the first rear surface of the seating assembly, wherein a first storage space is defined at least partially by the first partition and over the second seating assembly;

a second partition extending parallel to the first partition and proximate the second seating assembly, wherein a second storage space is at least partially defined by the second partition within the cargo space;

a first divider wall extending from the first partition across the first storage space;

a second divider wall extending from the second partition across the second storage space, wherein the first divider wall extends from the first partition between the first seating assembly and the second seating assembly and the second divider wall extends from the second partition between the second seating assembly and the vehicle liftgate;

a first sidewall and a second sidewall extending from opposing ends of the second partition, and wherein the first sidewall and the second sidewall extend over the second base portion;

a cross feature coupled with the second divider wall, wherein the cross feature extends between the first sidewall and the second sidewall parallel to the second partition; and at least one inner door operably coupled to the cross feature, wherein the at least one inner door is selectively actuated to provide access to the second storage space.

9. The vehicle storage system of claim 1, wherein the first storage space includes a first storage section and a second storage section on opposing sides of the first divider wall, and wherein the second storage space includes a third storage section and a fourth storage section on opposing sides of the second divider wall.

10. The vehicle storage system of claim 3, further comprising:

a cross member extending between the first partition and the third partition, and wherein the cross member is coupled to a top edge of the first divider wall.

11. The vehicle storage system of claim 1, wherein the first storage space is disposed between the first rear surface of the first seating assembly and the second seating assembly and the second storage space is disposed between the second rear surface of the second seating assembly and the vehicle liftgate.

12. A storage system for a vehicle, comprising:

a base including a first portion proximate a rear seating space and a second portion proximate a floor of a cargo space;

a first storage assembly defining a first storage space disposed on the first portion of the base, the first storage assembly includes:

a first partition and a second partition extending from the base, wherein the first partition and the second partition are parallel to and spaced apart from one another;

a divider extends between the first partition and the second partition across the rear seating space; and a second storage assembly defining a second storage space disposed on the second portion of the base, the second storage assembly includes:

a third partition extending from the base; and a dividing wall extending from the third partition across the floor of the cargo space.

13. The storage system of claim 12, further comprising:

a cross member extending between the first partition and the second partition, wherein the cross member defines notches.

14. The storage system of claim 13, wherein the first partition and the second partition each include a top edge, and wherein the notches of the cross member are configured to receive the top edges of the first partition and the second partition.

15. The storage system of claim 12, wherein the base defines slots and the divider of the first storage assembly includes coupling extensions, and wherein the coupling extensions are received by the slots to retain the divider in a selected position.

* * * * *